United States Patent
Ohzawa et al.

(10) Patent No.: US 6,450,648 B1
(45) Date of Patent: Sep. 17, 2002

(54) OBLIQUE PROJECTION OPTICAL SYSTEM

(75) Inventors: Soh Ohzawa, Toyonaka; Mituaki Shimo, Osaka, both of (JP)

(73) Assignee: Minolta Co., Ltd., Osaka (JP)

( * ) Notice: Subject to any disclaimer, the term of this patent is extended or adjusted under 35 U.S.C. 154(b) by 40 days.

(21) Appl. No.: 09/615,044

(22) Filed: Jul. 12, 2000

(30) Foreign Application Priority Data

Jul. 15, 1999 (JP) .......................................... 11-201509

(51) Int. Cl.[7] .......................... G03B 21/00; G03B 21/14
(52) U.S. Cl. ....................................................... 353/70
(58) Field of Search ..................................... 353/69, 70

(56) References Cited

U.S. PATENT DOCUMENTS

| | | | |
|---|---|---|---|
| 5,032,022 A | 7/1991 | Sato et al. | 353/69 |
| 5,096,288 A | 3/1992 | Yano et al. | 353/69 |
| 5,220,363 A | 6/1993 | Sato et al. | 353/69 |
| 5,302,983 A | 4/1994 | Sato et al. | 353/69 |
| 5,422,691 A | 6/1995 | Ninomiya et al. | 353/69 |
| 5,442,413 A | 8/1995 | Tejima et al. | 353/69 |
| 5,479,224 A | 12/1995 | Yasugaki et al. | 353/101 |
| 5,587,836 A | 12/1996 | Takahashi et al. | 359/630 |
| 5,709,445 A | 1/1998 | Takamoto | 353/70 |
| 5,716,118 A | 2/1998 | Sato et al. | 353/98 |
| 5,820,240 A | 10/1998 | Ohzawa | 353/70 |

FOREIGN PATENT DOCUMENTS

| | | |
|---|---|---|
| JP | 5-100312 A | 4/1993 |
| JP | 5-113600 A | 5/1993 |
| JP | 5-119283 A | 5/1993 |
| JP | 5-119395 A | 5/1993 |

OTHER PUBLICATIONS

Bryan D. Stone and G. W. Forbes, "Characterization of first–order optical properties for asymmetric systems", Journal of the Optical Society of America A, vol. 9, No. 3, pp. 478–489 (Mar. 1992).

Bryan D. Stone and G. W. Forbes, "Foundations of the first–order layout for asymmetric systems: an application of Hamilton's methods", Journal of the Optical Society of America A, vol. 9, No. 1, pp. 96–109 (Jan. 1992).

*Primary Examiner*—Russell Adams
*Assistant Examiner*—Melissa Koval
(74) *Attorney, Agent, or Firm*—Sidley Austin Brown & Wood LLP

(57) ABSTRACT

An oblique projection optical system performing enlargement projection in a slanting direction from a primary image plane to a secondary image plane, or reduction projection in a slanting direction from the secondary image plane to the primary image plane. The oblique projection optical system has at least two lens units each comprising at least one lens element and having surfaces decentered with respect to each other, wherein zooming is performed by moving, of said lens units, a plurality of lens units, and wherein when a ray connecting a center of the primary image plane and a center of the secondary image plane is referred to as an image plane center ray, the predetermined conditions are satisfied without an intermediate real image being formed between the primary image plane and the secondary image plane.

9 Claims, 12 Drawing Sheets

OBLIQUE PROJECTION OPTICAL SYSTEM

RELATED APPLICATION

This application is based on application No. 11-201509 filed in Japan, the content of which is hereby incorporated by reference.

FIELD OF THE INVENTION

The present invention relates to an oblique projection optical system, for example, to an oblique projection optical system suitable for use in an image projector and an image reader.

DESCRIPTION OF THE PRIOR ART

A projector that projects an image displayed on a liquid crystal display or the like onto a screen while enlarging it has been known. With the objective of reducing the overall size of a projector while increasing the screen size, various types of projectors that project an image from a slanting direction have been proposed. Oblique projectors of this type in which the projection optical system is disposed away from the center of the screen also produce an advantage that the projector does not obstruct the user's view.

However, in the oblique projectors, a so-called trapezoidal distortion occurs in projected images. Moreover, in view of user convenience, a function that makes the enlargement magnification variable (that is, zoom function) is further desired. A projector in which some contrivance is given to the lens moving method in order to achieve correction of the trapezoidal distortion and provision of the zoom function is proposed in Japanese Laid-open Patent Application 5-119395. In this prior art application, however, there is no specific disclosure of the optical structure, and according to the optical structure proposed in the prior art application, it is difficult to reduce the size of the projection optical system and secure a sufficient angle of oblique projection.

SUMMARY OF THE INVENTION

An object of the present invention is to provide an improved oblique projection optical system.

Another object of the present invention is to provide a compact and high-performance oblique projection optical system in which a sufficient angle of oblique projection can be secured, said oblique projection optical system being a practical wide-angle and high-magnification zoom optical system.

The above-mentioned objects are achieved by an oblique projection optical system having the following structure:

An oblique projection optical system performing enlargement projection in a slanting direction from a primary image plane to a secondary image plane, or reduction projection in a slanting direction from the secondary image plane to the primary image plane, is provided with at least two lens units each comprising at least one lens element and having surfaces decentered with respect to each other. Zooming is performed by moving, of the lens units, a plurality of lens units. When a ray connecting the center of the primary image plane and the center of the secondary image plane is referred to as an image plane center ray, the following conditions (1) and (2) are satisfied without an intermediate real image being formed between the primary image plane and the secondary image plane:

$$5° < |\theta oi| < 40° \quad (1)$$

$$20° < \theta o < 50° \quad (2)$$

where $|\theta oi|$ is the angle between the primary image plane and the secondary image plane; and $\theta o$ is the angle between the normal to the secondary image plane and the image plane center ray in a condition where the magnification on the primary image plane side is lowest [W].

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENT

Figure 1:
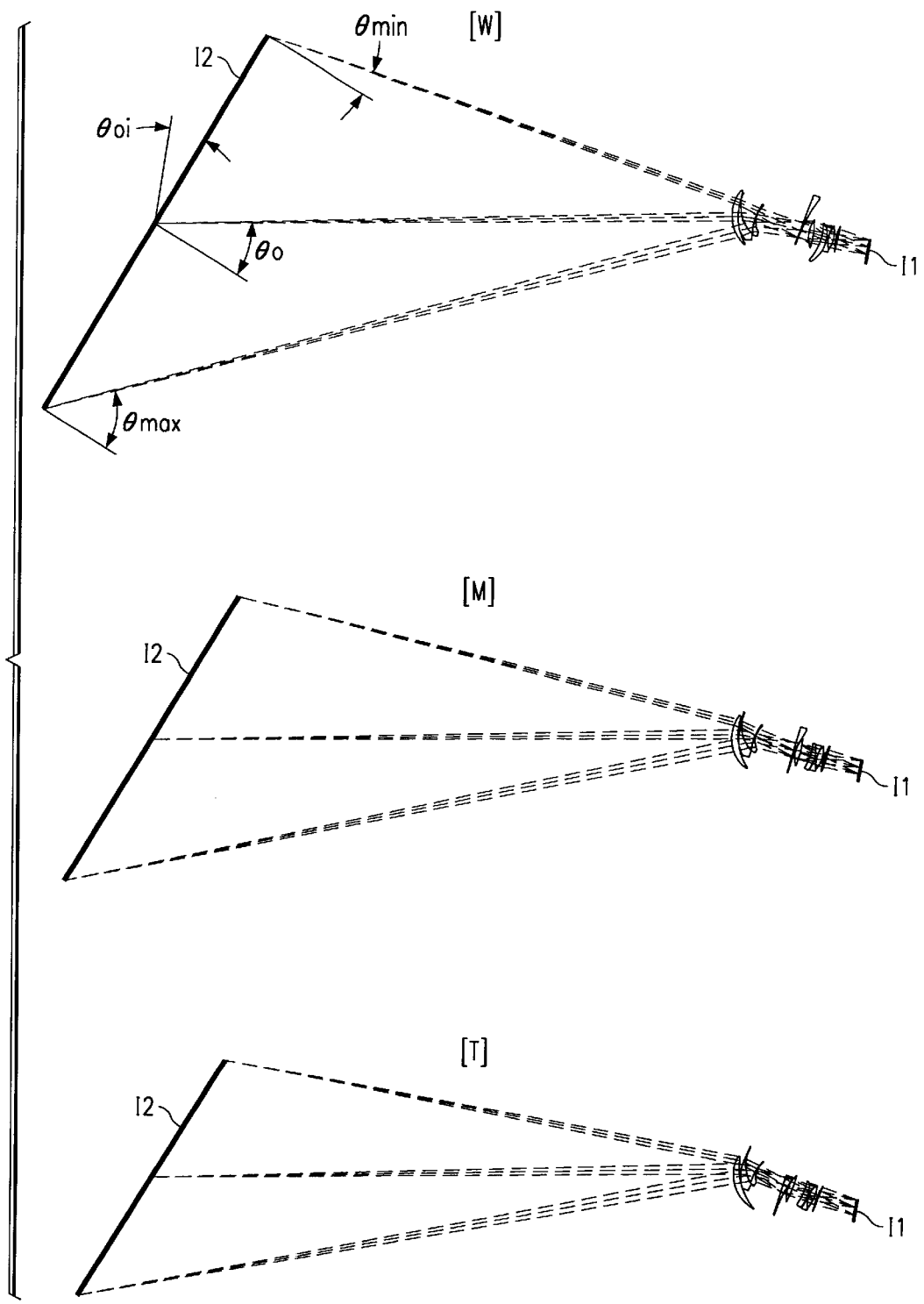
FIG. 1 is an optical path diagram of a first embodiment (first example)
Figure 2:
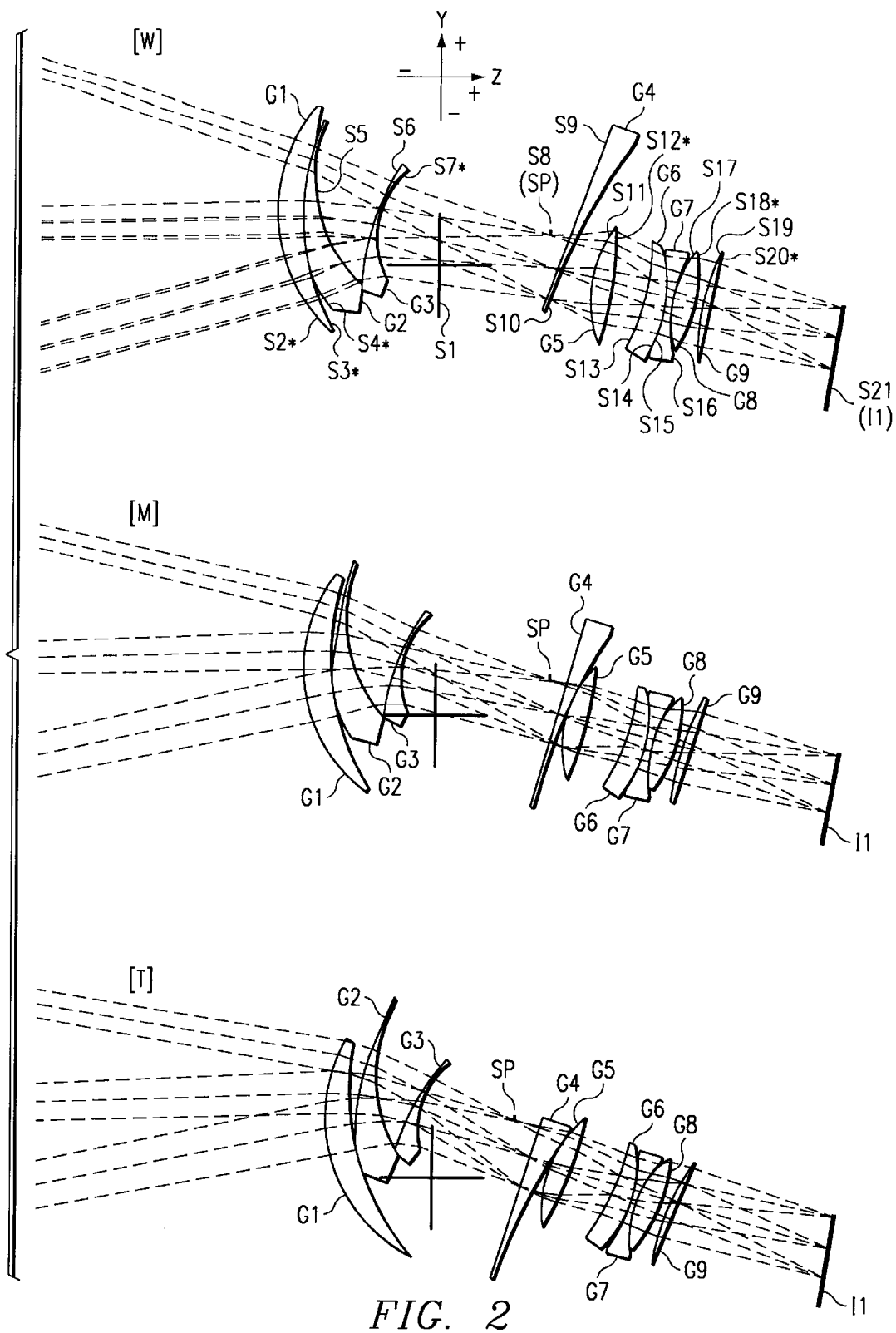
FIG. 2 is a view showing the lens construction and optical path of the first embodiment (first example)
Figure 3:
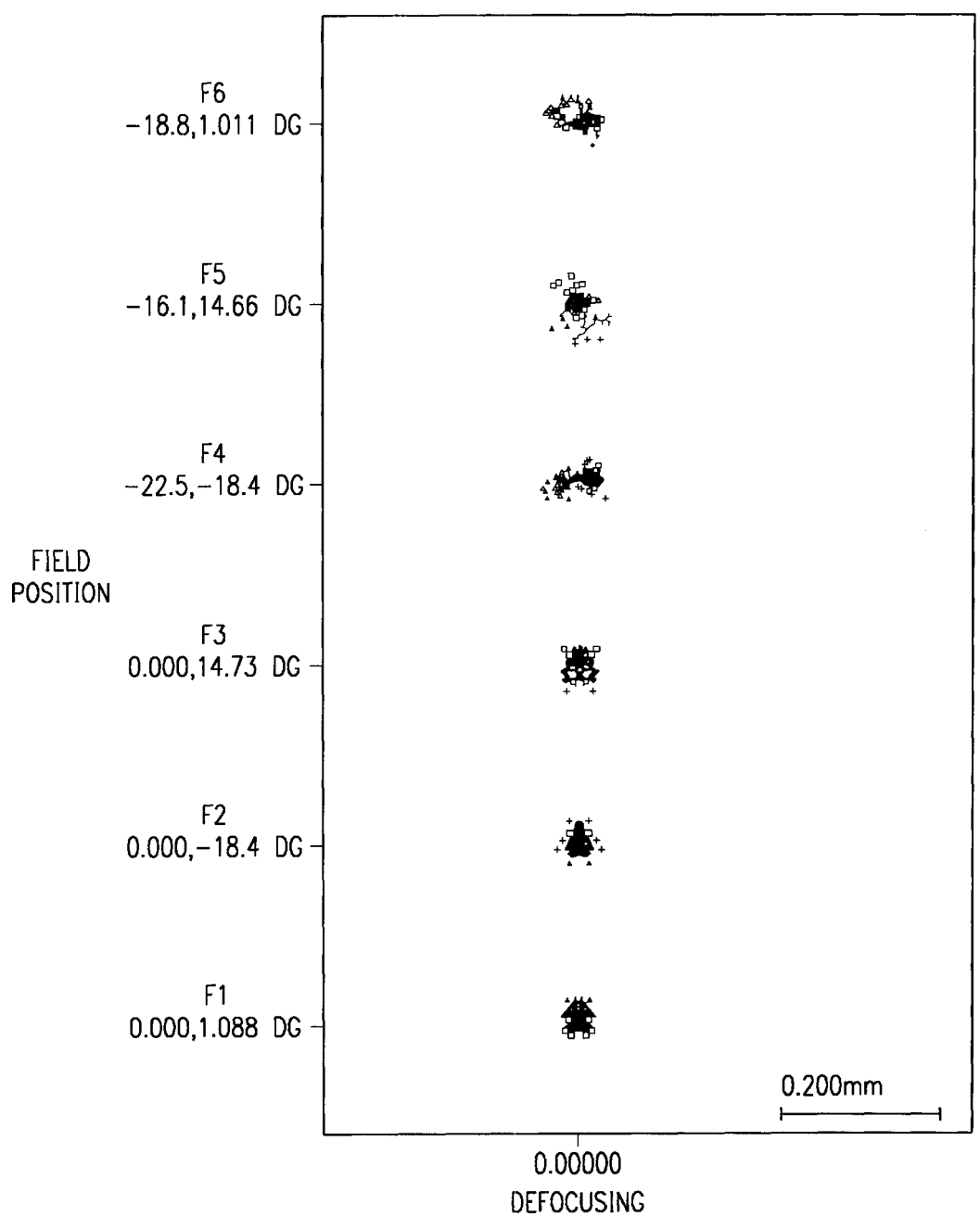
FIG. 3 is a spot diagram of the first example in a wide-angle condition.
Figure 4:
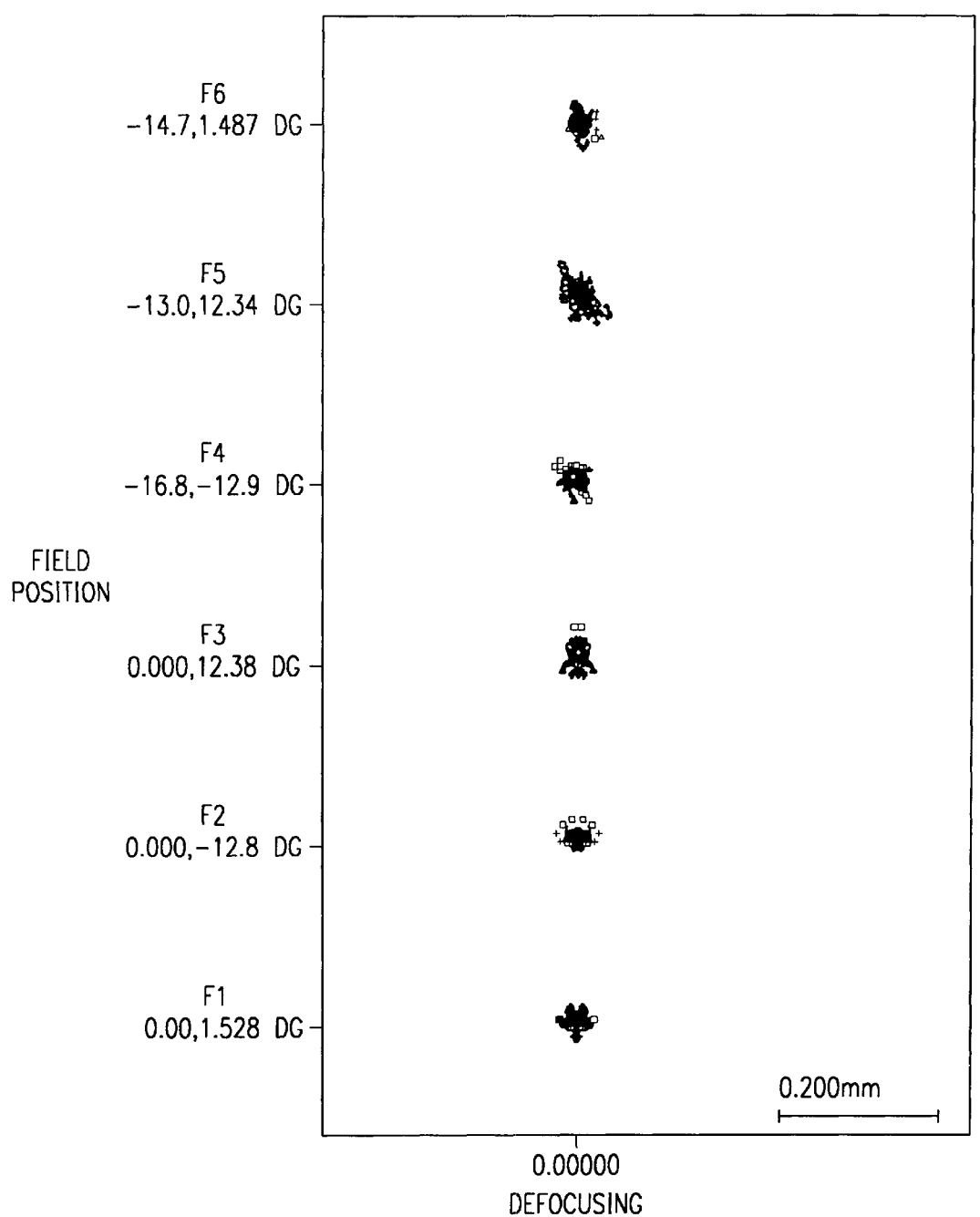
FIG. 4 is a spot diagram of the first example in a middle condition.
Figure 5:
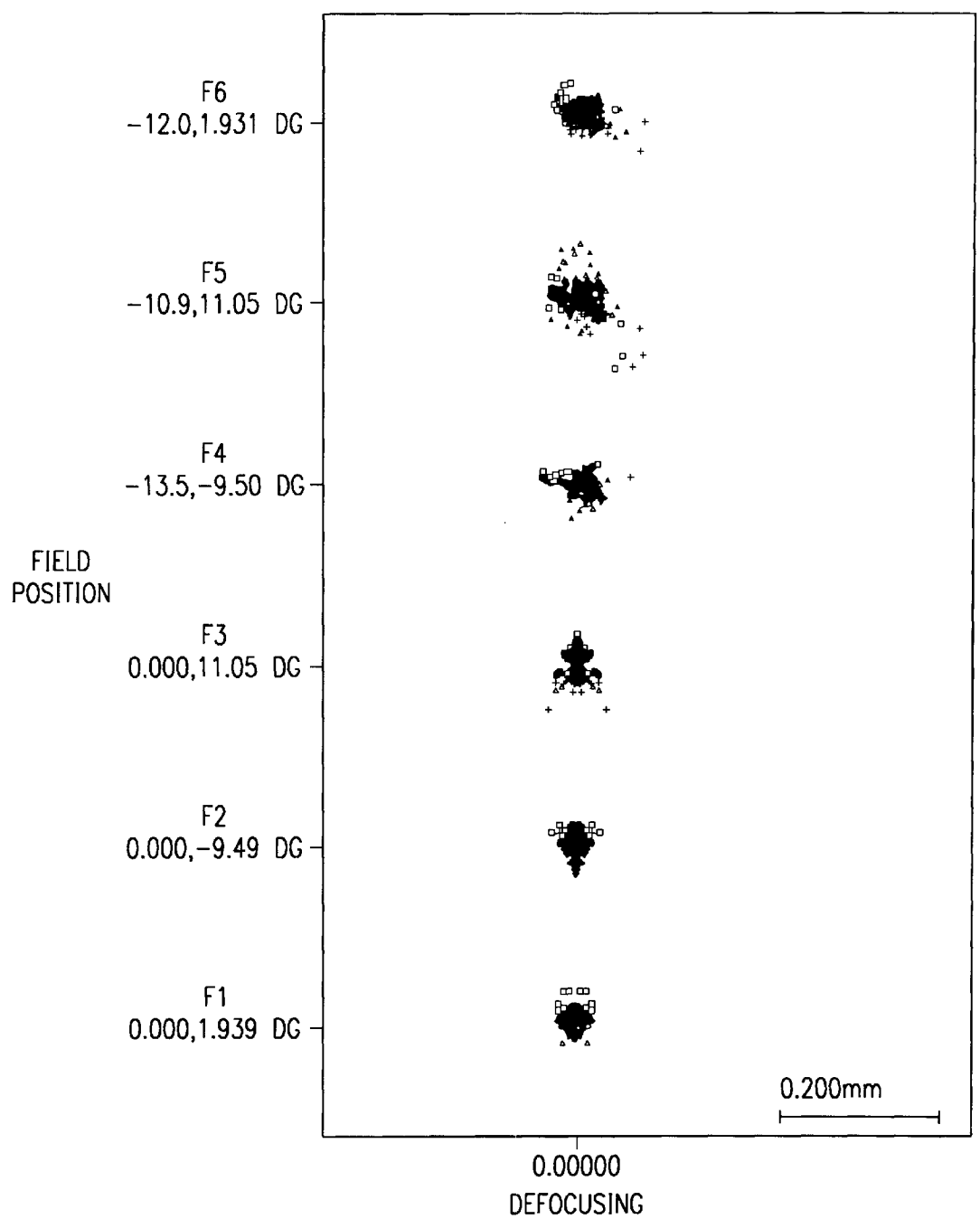
FIG. 5 is a spot diagram of the first example in a telephoto condition.
Figure 6:
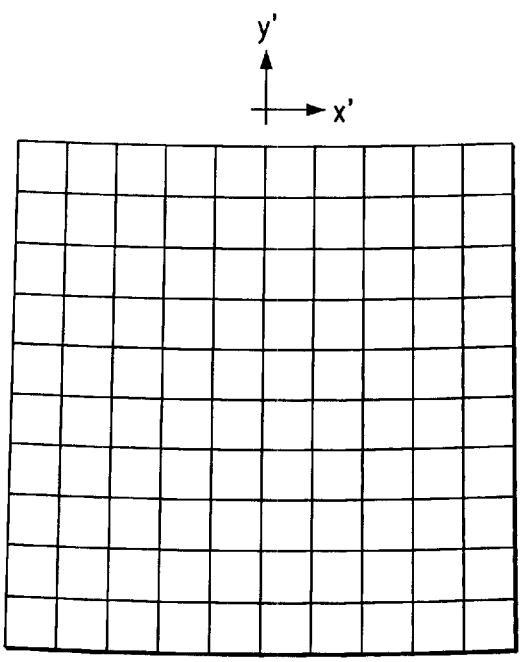
FIG. 6 is a distortion diagram of the first example in the wide-angle condition.
Figure 7:
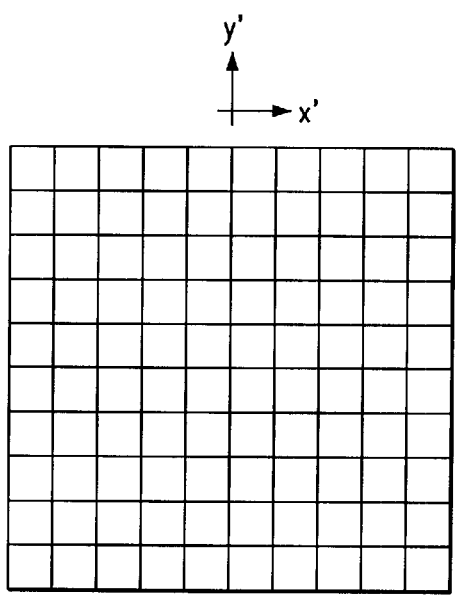
FIG. 7 is a distortion diagram of the first example in the middle condition.
Figure 8:
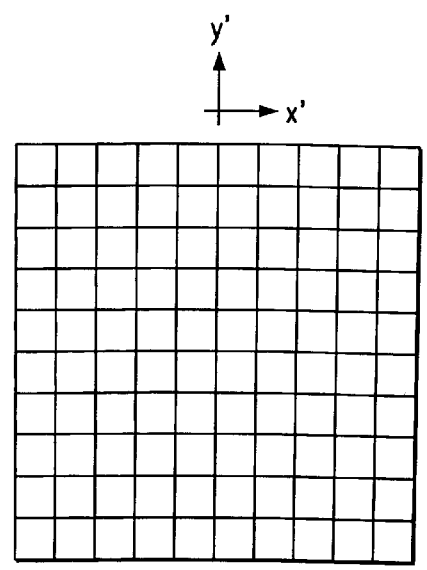
FIG. 8 is a distortion diagram of the first example in the telephoto condition.
Figure 9:
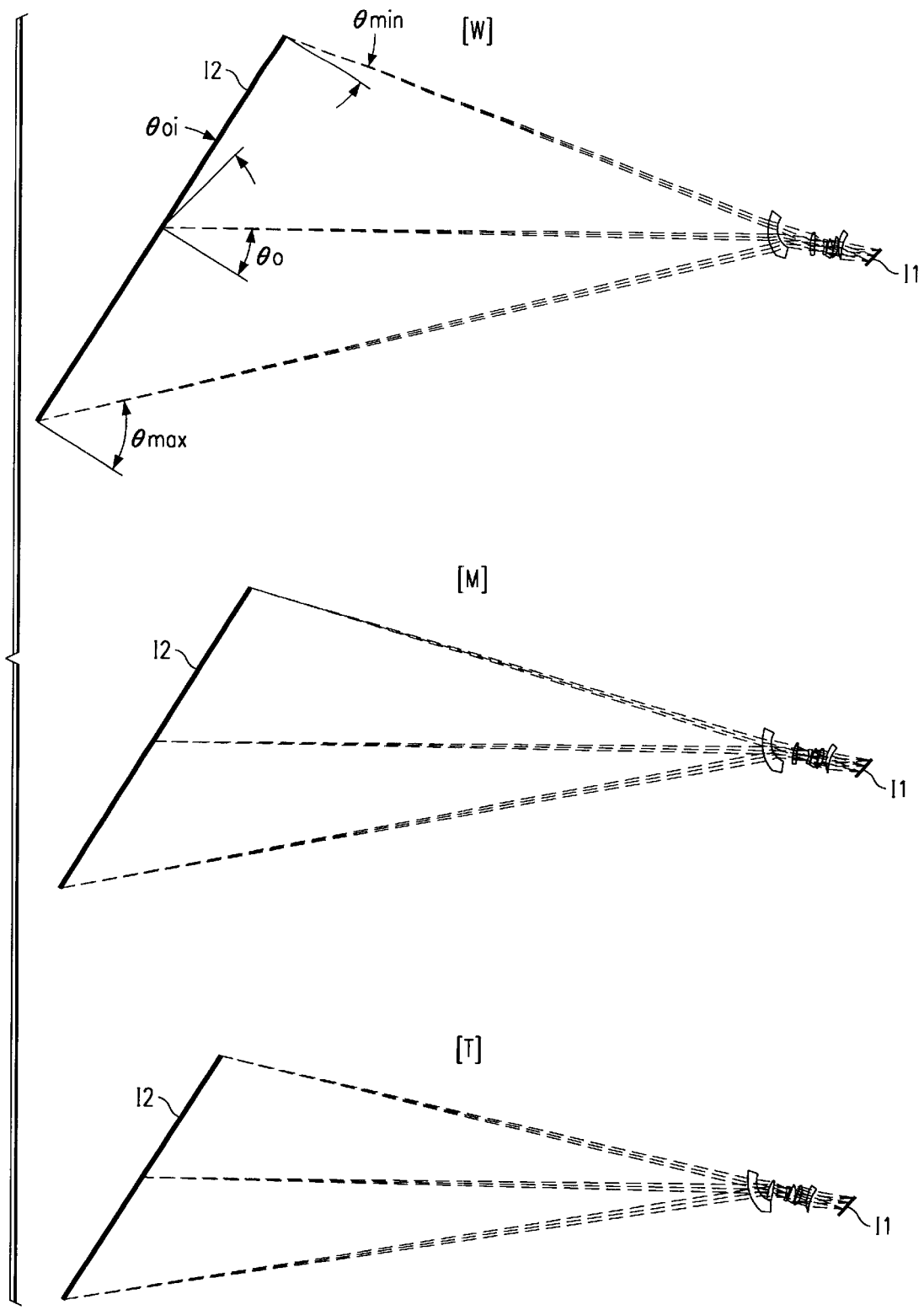
FIG. 9 is an optical path diagram of a second embodiment (second example)
Figure 10:
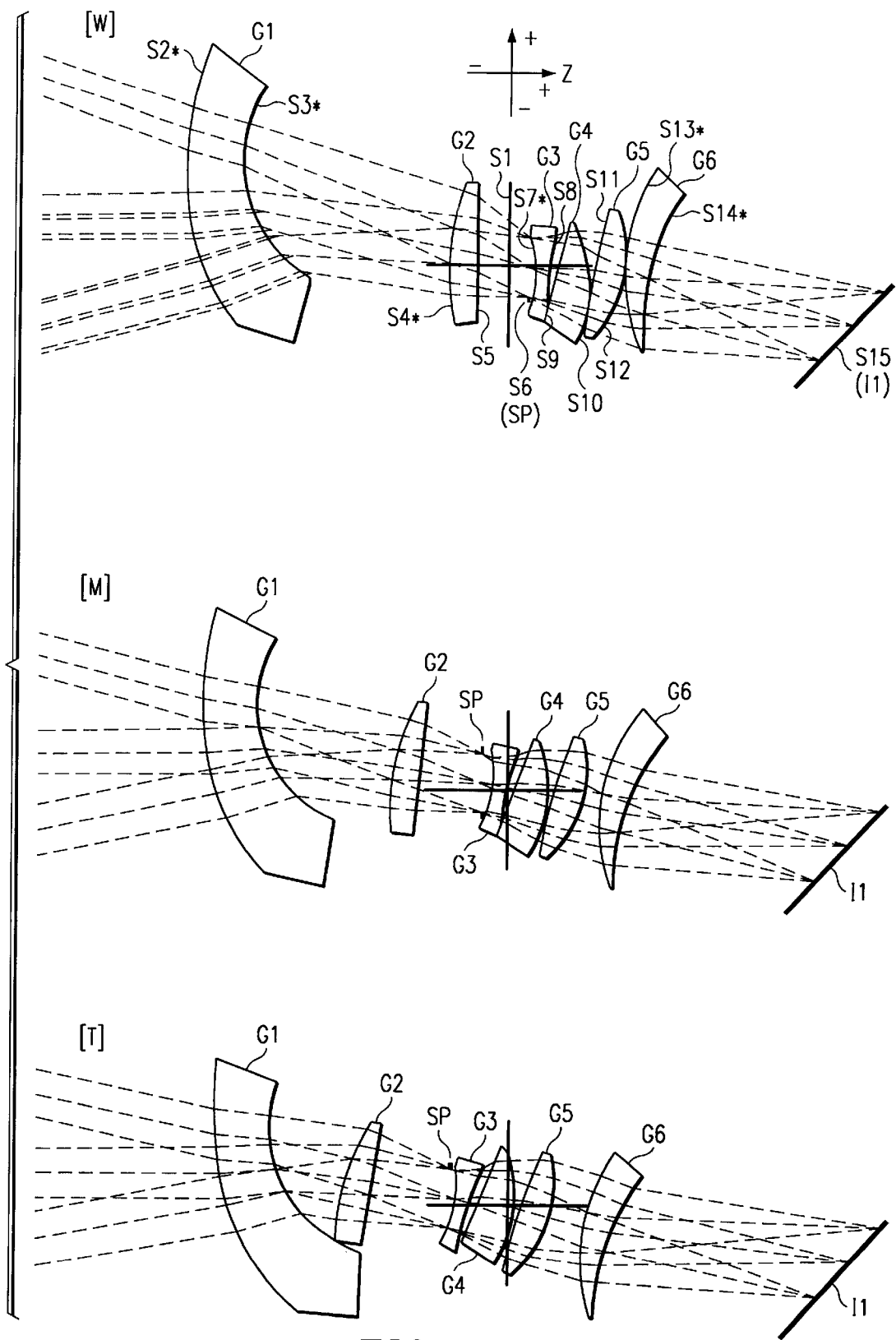
FIG. 10 is a view showing the lens construction and optical path of the second embodiment (second example)
Figure 11:
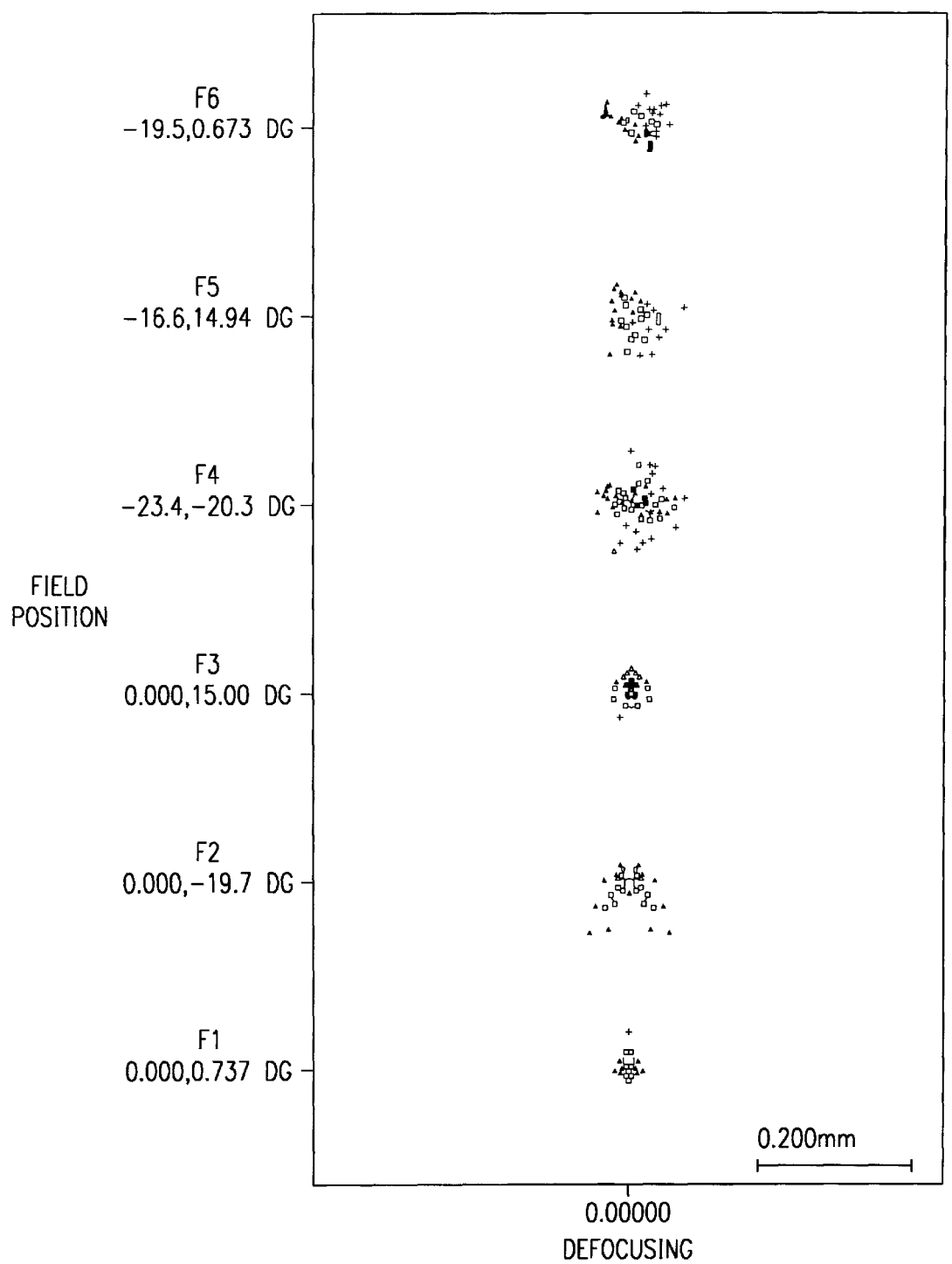
FIG. 11 is a spot diagram of the second example in the wide-angle condition.
Figure 12:
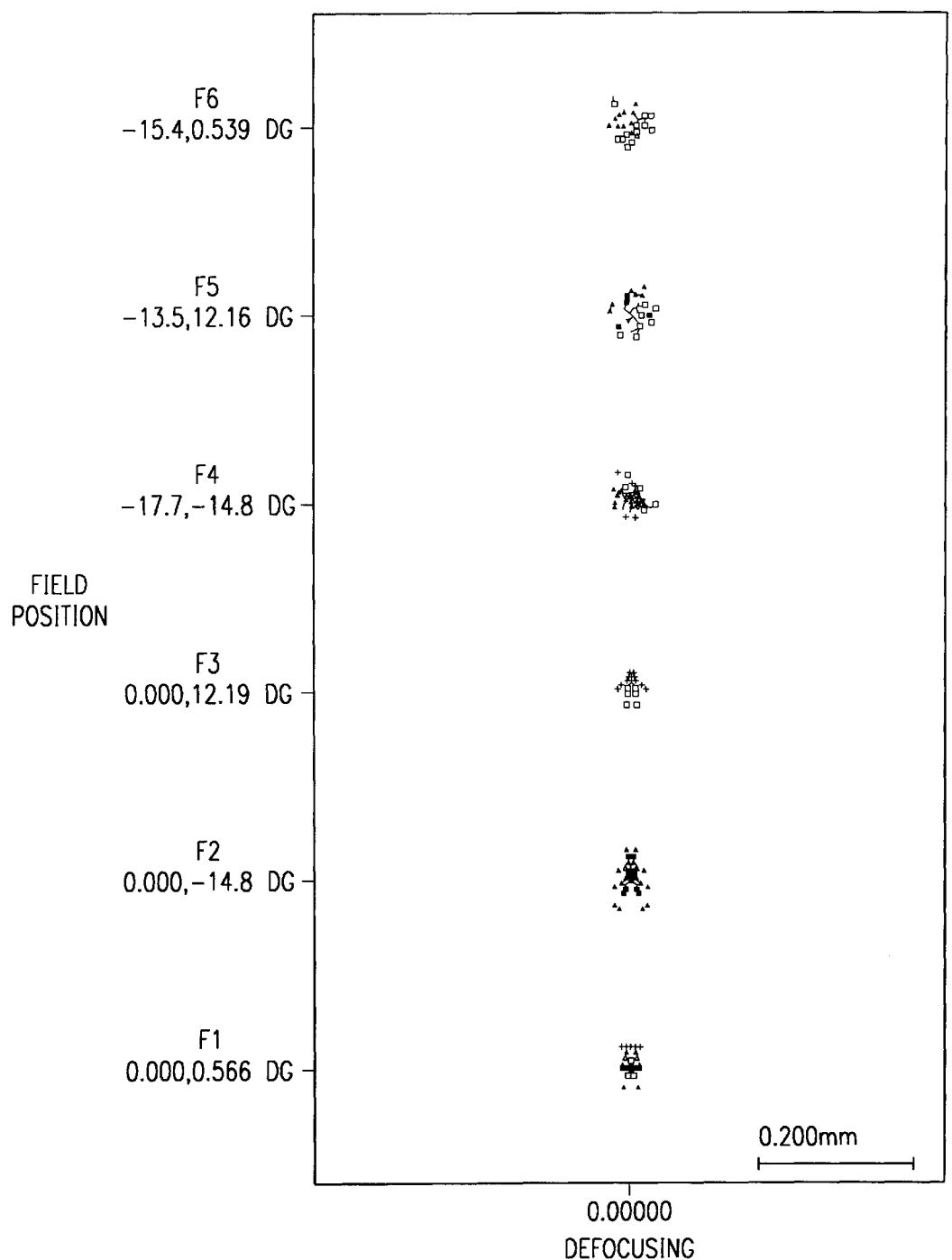
FIG. 12 is a spot diagram of the second example in the middle condition.
Figure 13:
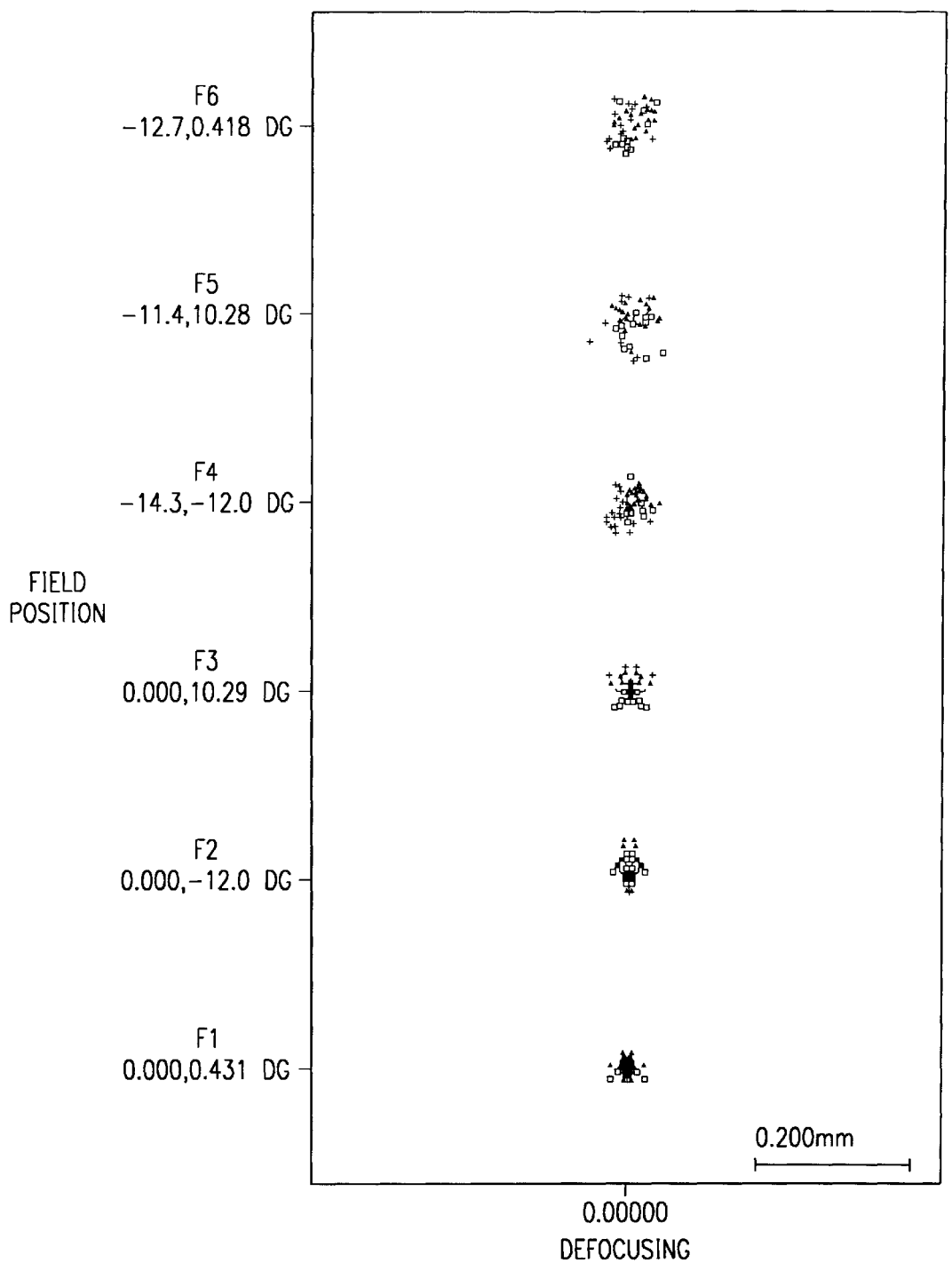
FIG. 13 is a spot diagram of the second example in the telephoto condition.
Figure 14:
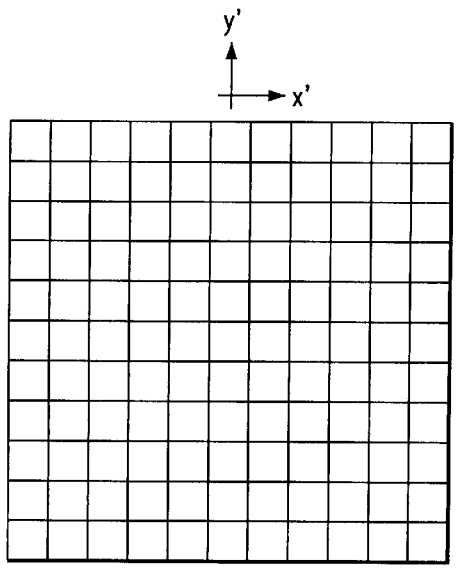
FIG. 14 is a distortion diagram of the second example in the wide-angle condition.
Figure 15:
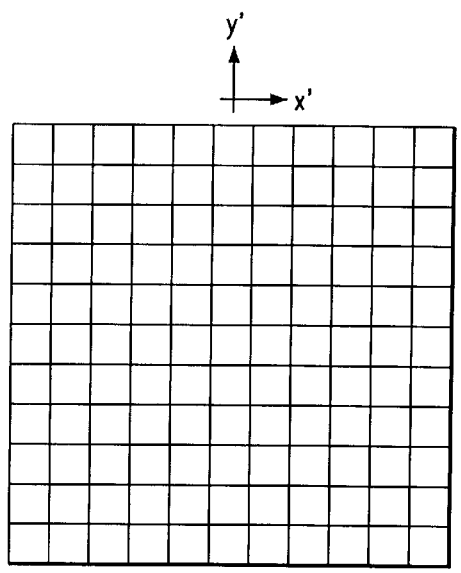
FIG. 15 is a distortion diagram of the second example in the middle condition.
Figure 16:
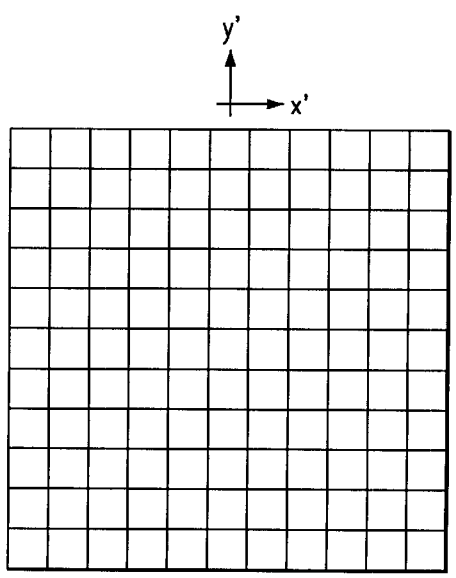
FIG. 16 is a distortion diagram of the second example in the telephoto condition.

Hereinafter, oblique projection optical systems embodying the present invention will be described with reference to the drawings. FIGS. 1 and 9 show the entire optical paths from a primary image plane (I1) to a secondary image plane (I2) corresponding to first and second embodiments, respectively. FIGS. 2 and 10 show the lens constructions and optical paths corresponding to the first and the second embodiments, respectively. FIGS. 1, 2, 9 and 10 show the Y-Z cross section structures in a subsequently described rectangular coordinate system (X, Y, Z) in the following magnification conditions: the wide-angle condition (lowest magnification condition on the reduction side) [W]: the middle condition (intermediate magnification condition)

[M]; and the telephoto condition (highest magnification condition on the reduction side) [T]. In FIGS. 2 and 10, the lens elements designated Gi (i=1,2,3, . . . ) are the i-th lens elements counted from the side of the secondary image plane (I2) (that is, the enlargement side), the surfaces designated Si (i=1,2,3, . . . ) are the i-th surfaces counted from the side of the secondary image plane (I2), and the surfaces Si (i=2,3, . . . ) marked with asterisks are aspherical.

The first and the second embodiments are oblique projection optical systems, for use in an image projector, that perform enlargement projection in a slanting direction from the primary image plane (I1) to the secondary image plane (I2). Therefore, the primary image plane (I1) corresponds to a display device screen for displaying two-dimensional images (for example, the display screen of a liquid crystal display (LCD)), and the secondary image plane (I2) corresponds to a projection image plane (that is, the screen plane). The embodiments can be used in an image reader as an oblique projection optical system that performs enlargement projection in a slanting direction from the secondary image plane (I2) to the primary image plane (I1). In that case, the primary image plane (1) corresponds to a light receiving device plane for performing image reading (for example, the light receiving plane of a charge coupled device (CCD)), and the secondary image plane (I2) corresponds to the read image plane (that is, the original plane of film or the like).

The first embodiment (FIGS. 1 and 2) comprises from the side of the secondary image plane (I2) a positive lens element (G1), a negative lens element (G2), a negative lens element (G3), a diaphragm (SP), a negative lens element (G4), a positive lens element (G5), a positive lens element (G6), a negative lens element (G7), a positive lens element (G8) and a positive lens element (G9). Both side surfaces (S2) and (S3) of the first lens element (G1) are aspherical surfaces convex to the enlargement side. The enlargement side surface (S4) of the second lens element (G2) is aspherical. The surfaces (S7), (S12), (S18) and (S20), on the side of the primary image plane (I1) (that is, on the reduction side), of the third, the fifth, the eighth and the ninth lens elements (G3), (G5), (G8) and (G9) are aspherical. The lens elements (G1) to (G9) and the primary and the secondary image planes (I1) and (I2) are decentered with respect to a reference surface (S1). The surfaces (S2) and (S3) of the first lens element (G1) are decentered with respect to each other.

The second embodiment (FIGS. 9 and 10) comprises from the side of the secondary image plane (I2) a negative lens element (G1), a positive lens element (G2), a X diaphragm (SP), a negative lens element (G3), a positive lens element (G4), a positive lens element (G5) and a positive lens element (G6). The both side surfaces (S2) and (S3) of the first lens element (G1) are aspherical surfaces convex to the enlargement side. The enlargement side surfaces (S4) and (S7) of the second and the third lens elements (G2) and (G3) are aspherical. The both side surfaces (S13) and (S14) of the sixth lens element (G6) are aspherical. The lens elements (G1) to (G6) and the primary and the secondary image planes (I1) and (I2) are decentered with respect to the reference surface (S1). The surfaces (S2) and (S3) of the first lens element (G1) are decentered with respect to each other.

The first and the second embodiments each have at least two lens units, and each lens unit comprises at least one lens element and has surfaces decentered with respect to each other. The lens units each constitute a zoom block moved for zooming. In the first embodiment, the first to the fifth lens elements (G1) to (G5) constitute five zoom blocks that are independently moved for zooming, and the diaphragm (SP) constitute one zoom block that is independently moved for zooming. The sixth to the ninth lens elements (G6) to (G9) constitute one zoom block in which the four lens elements are integrally moved for zooming. In the second embodiment, the lens elements (G1) to (G6) and the diaphragm (SP) constitute seven zoom blocks that are independently moved for zooming.

It is desirable that at least two lens units having surfaces decentered with respect to each other be provided and that no intermediate real image be formed between the primary and the secondary image planes (I1) and (I2) like the embodiments. This enables the overall size of the oblique projection optical system to be reduced. Further, by performing zooming by moving a plurality of lens units having surfaces decentered with respect to each other, the enlargement and the reduction magnifications of oblique projection can be made variable. Desirable conditions in the optical structure of the oblique projection optical system having such a zoom function will be described.

When a ray connecting the center of the primary image plane (I1) and the center of the secondary image plane (I2) is referred to as an "image plane center ray", it is desirable that the following conditions (1) and (2) be satisfied with no intermediate real image being formed between the primary image plane (I1) and the secondary image plane (I2):

$$5° < |\theta oi| < 40° \quad (1)$$

$$20° < \theta o < 50° \quad (2)$$

where

|θoi| is the angle between the primary image plane (I1) and the secondary image plane (I2), and θo is the angle between the normal to the secondary image plane (I2) and the image plane center ray in a condition where the magnification on the side of the primary image plane (I1) is lowest [W].

When the lower limit of the condition (1) is exceeded, the primary image plane (I1) and the secondary image plane (I2) are close to parallel, so that in order to suppress the trapezoidal distortion, it is necessary that the entrance pupil and the exit pupil be closer to each other. Consequently, it is difficult for the optical system to have a structure telecentric to the reduction side (structure in which the pupil is situated far). As a result, color unevenness occurs due to a display device (for example, an optical device having an angular characteristic such as an LCD) disposed in the position of the primary image plane (I1) and a color separation and color synthesis system (a dichroic mirror, a dichroic prism, etc.) disposed in the vicinity of the display device. When the upper limit of the condition (1) is exceeded, the decentering amount of each lens element for suppressing the trapezoidal distortion is too large, so that it is difficult to correct coma aberration and astigmatism.

When the lower limit of the condition (2) is exceeded, the effect of oblique projection decreases. For example, in a front projector, an advantage that the projected image can be viewed from the front of the screen is not obtained, and in a rear projector, the effect of thickness reduction is not obtained. When the upper limit of the condition (2) is exceeded, the trapezoidal distortion associated with oblique projection cannot be suppressed.

In zooming from the condition where the magnification on the side of the primary image plane (I1) is low (for example, the wide-angle condition [W]) to a condition where the magnification is high (for example, the telephoto condition [T]), it is desirable that at least one positive lens unit be monotonously moved toward the secondary image plane (I2). In the first embodiment, in zooming from the wide-angle condition [W] to the telephoto condition [T], the fifth lens element (G5) having positive optical power is monotonously moved toward the secondary image plane (I2). In the second embodiment, in zooming from the wide-angle condition [W] to the telephoto condition [T], the second lens element (G2) having positive optical power is monotonously moved toward the secondary image plane (I2). Since employment of this characteristic structure enables suppression of variation in the positions of the image planes (I1) and (I2) in zooming, the overall length of the lens system can be reduced. It is further desirable that at least two lens units including a positive lens unit and a negative lens unit be moved in zooming like the embodiments. Employment of this structure enables a high zoom ratio to be ensured.

In zooming from the condition where the magnification on the side of the primary image plane (I1) is low (for example, the wide-angle condition [W]) to the condition where the magnification is high (for example, the telephoto condition [T]), it is desirable that at least one positive lens unit (corresponding to the fifth lens element (G5) in the first embodiment and the second lens element (G2) in the second embodiment) be moved and that the positive lens unit satisfy the following condition (3):

$$0.7<(LPW/LPT)/(\beta W/\beta T)<2.5 \quad (3)$$

where $\beta T$ is the highest magnification on the side of the primary image plane (I1), $\beta W$ is the lowest magnification on the side of the primary image plane (I1), LPT is the optical path length of the image plane center ray from the most secondary image plane (I2) side surface to the most primary image plane (I1) side surface of the positive lens unit in the condition where the magnification on the side of the primary image plane (I1) is highest [T], and LPW is the optical path length of the image plane center ray from the most secondary image plane (I2) side surface to the most primary image plane (I1) side surface of the positive lens unit in the condition where the magnification on the side of the primary image plane (I1) is lowest [W].

When the lower limit of the condition (3) is exceeded, the movement amounts of the lens elements are too large in order to cope with zooming, so that the overall length increases to make the optical system not compact. When the upper limit of the condition (3) is exceeded, the optical powers of the lens elements are too strong in order to cope with zooming, so that it is difficult to correct curvature of field and coma aberration.

It is desirable that at least one lens element whose both side surfaces are convex to the secondary image plane (I2) side be provided on the secondary image plane (I2) side of the diaphragm (SP) and that the lens element (corresponding to the second lens element (G2) in the first embodiment and the first lens element (G1) in the second lens element) satisfy the following condition (4) on a cross section where the image plane center ray is oblique to the secondary image plane (I2) when the magnification on the side of the primary image plane (I1) is lowest [W]:

$$1.1<Pf/Pn<4.5 \quad (4)$$

where

Pn is the optical path length of a principal ray passing through the lens element which principal ray forms the smallest angle with respect to the normal to the secondary image plane (I2), and Pf is the optical path length of a principal ray passing through the lens element which principal ray forms the largest angle with respect to the normal to the secondary image plane (I2).

The principal ray that forms the smallest angle with respect to the normal to the secondary image plane (I2) is one constituting the secondary image plane (I2) in a position closest to the diaphragm (SP), and the angle is θmin shown in FIGS. 1 and 9. The principal ray that forms the largest angle with respect to the normal to the secondary image plane (I2) is one constituting the secondary image plane (I2) in a position farthest from the diaphragm (SP), and the angle is θmax shown in FIGS. 1 and 9.

By both of the surfaces of the lens element situated on the secondary image plane (I2) side of the diaphragm (SP) being convex to the secondary image plane (I2) side, a ray from the secondary image plane (I2) side can be prevented from impinging on the surfaces of the lens element at a large angle (when the oblique projection optical system is regarded as a reduction system). Consequently, excessive aberration can be prevented. Further, by the radius of curvature of the reduction side surface of the lens element being larger than that of the enlargement side surface thereof, it is possible to provide the lens element with positive optical power. This enables light from a peripheral part of the image plane to converge to the center of the diaphragm (SP). Consequently, the distance from the most enlargement side optical surface (S2) to the diaphragm (SP) can be decreased to reduce the overall length of the optical system.

When the lower limit of the condition (4) is exceeded, a prism effect that bends a ray from the enlargement side in the negative direction of the Y axis is too small, so that it is difficult to correct the trapezoidal distortion and astigmatism caused by oblique projection. When the upper limit of the condition (4) is exceeded, the prism effect is too large, so that it is difficult to correct asymmetric chromatic aberration generated in the lens element.

While the surfaces (S2) and (S3) of the first lens element (G1) are aspherical surfaces decentered with respect to each other in the embodiments, it is further desirable that a lens element having aspherical surfaces decentered with respect to each other as described above be provided on the secondary image plane (I2) side of the diaphragm (SP). This increases a free-form surface effect (that is, an effect that provides different optical powers in the direction of the X axis and in the direction of the Y axis), so that the magnification difference between the direction of the X axis and the direction of the Y axis (strictly speaking, the magnification difference associated with the directions of x and x' axes and the directions of y and y' axes in subsequently described rectangular coordinate systems (x, y, z) and (x', y', z')) can be reduced.

It is desirable that a negative lens element and a positive lens element be provided in this order on the reduction side of the diaphragm (SP) and that the medium of the negative lens element satisfy the conditions (5) and (6) show below. In the first embodiment, the negative lens element is the seventh lens element (G7) and the positive lens element is the eighth lens element (G8). In the second embodiment, the negative lens element is the third lens element (G3) and the positive lens element is the fourth lens element (G4).

$$Nb>1.7 \quad (5)$$

$$vb<40 \quad (6)$$

where Nb is the refractive index, to the d-line, of the medium of the negative lens element, and vb is the Abbe number of the medium of the negative lens element.

Since the overall optical power of the lens elements on the reduction side of the diaphragm (SP) is positive, it is necessary to dispose a negative lens element in order to correct spherical aberration and curvature of field on the reduction side of the diaphragm (SP). Further, it is necessary to accommodate the optical system to the disposition and the angular characteristic of the display device such as an LCD by increasing the lens back focal length by providing at least one pair of a negative lens element and a positive lens element disposed in this order. This enables well-balanced correction of aberrations generated in the lens elements on the reduction side of the diaphragm (SP). When the refractive index is outside the range of the condition (5), it is impossible to suppress curvature of field generated in the other positive lens elements. When the Abbe number is outside the range of the condition (6), it is impossible to correct chromatic aberration generated in the other positive lens elements.

The above-described embodiments further have the following characteristic: When the focal length is defined as mentioned later, at least two lens units, that is, a lens unit having a negative focal length and including at least one lens element and a lens unit having a positive focal length and including at least one lens element are provided, and the overall focal length of the optical system is varied by varying at least one of the relative positions of the lens unit having a negative focal length and the lens unit having a positive focal length.

Generally, to vary the magnification of a projection optical system, the overall focal length of the optical system is varied (in order words, the projection optical system is formed as a zoom optical system). At that time, a group of lens elements having a plurality of focal lengths is regarded as a lens unit. In a nonaxisymmetric system including at least one decentered lens element, the movement of the lens units required for zooming is different from that of a coaxial system. That is, to perform zooming in the coaxial system, the relative distances between the lens units (that is, the distances in the direction of the optical axis) are varied, whereas to perform zooming in the nonaxisymmetric system, it is necessary to vary the relative positions of the lens units (for example, by rotating optical surfaces). Further, in view of aberration correction, it is necessary that a lens unit having a negative focal length and a lens unit having a positive focal length be provided.

While the focal lengths of the lens units are not varied in zooming in the case of the coaxial system, in the case of the nonaxisymmetric system, the focal length of each lens unit is sometimes varied in zooming in order that the image point is substantially fixed or formed at a desired position. However, to perform aberration correction in the lens units, it is preferable that the variation be not too large, and it is desirable that the ratio of the variation be within 30 percent of the original focal lengths of the lens units.

Definition of the Focal Length

Figure 17:
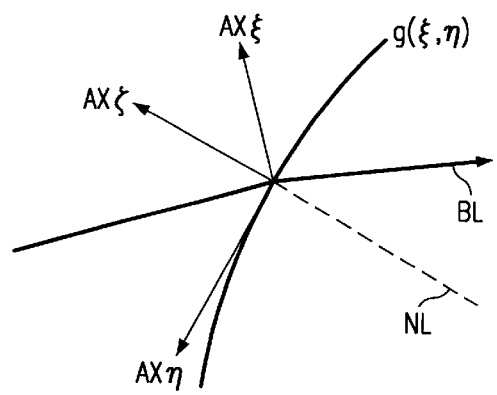
FIG. 17 is a schematic view showing a coordinate system for explaining the definition of the focal length.

The definition of the focal length will be explained with reference to FIG. 17. By using as the reference a ray (base ray (BL)) traveling from the object center by way of the diaphragm center toward the image plane, a value ascribed to a given surface (the i-th surface) is defined by a procedure (a), and the composite focal length from a given surface (the k-th surface) to a given surface (the n-th surface) is defined by a procedure (b). Here, the coordinate system of the i-th surface is a rectangular coordinate system ($\xi i, \eta i, \zeta i$) defined as follows: The direction of the normal (NL) to the i-th surface ($g(\xi, \eta)$) is the $\zeta i$ axis (AX$\zeta$), the direction vertical to the surface formed by the base ray (BL) incident on the i-th surface and the normal (NL) to the i-th surface (that is, the plane of incidence) is the $\xi i$ axis (AX$\xi$), and the direction where Qi×Ei is positive is the positive direction. Qi is the vector in the direction in which the base ray (BL) is incident on the i-th surface, Ei is the vector in the direction of the normal (NL) to the i-th surface, and the $\eta i$ axis (AX$\eta$) is decided by a right hand system with respect to the $\xi i$ axis (AX$\xi$) and the $\zeta i$ axis (AX$\zeta$).

1) Procedure (a)

With the base ray (BL) as the reference, the value ascribed to the i-th surface is defined as follows:

($\xi i$ direction)

$$F\xi i = -(di/ni) - \{1/(Di \cdot S\xi i)\},$$

$$M\xi i = 1/(Di \cdot S\xi i), \text{ and}$$

$$B\xi i = -1/(Di \cdot S\xi i); \text{ and}$$

($\eta i$ direction)

$$F\eta i = -(di/ni) - \{1/(Di \cdot S\eta i)\} \cdot \cos^2(\theta i),$$

$$M\eta i = \{1/(Di \cdot S\eta i)\} \cdot \cos(\theta i) \cdot \cos(\theta' i), \text{ and}$$

$$B\eta i = -\{1/(Di \cdot S\eta i)\} \cdot \cos^2(\theta' i).$$

Here, $$Di = \{ni \cdot \cos(\theta i) - n'i \cdot \cos(\theta' i)\},$$

$$S\xi i = \partial^2 gi/\partial \xi^2, \text{ and}$$

$$S\eta i = \partial^2 gi/\partial \eta^2,$$

where
  di is the actual distance, along the base ray (BL), from the point of exit of the (i−1)-th surface (that is, the surface immediately preceding the i-th surface) to the point of incidence on the i-th surface,
  ni is the refractive index of the medium of the i-th surface on the side immediately before the incidence of the base ray (BL),
  ni' is the refractive index of the medium of the i-th surface on the side immediately after the incidence of the base ray (BL),
  $\theta i$ is the angle of incidence of the base ray (BL) on the i-th surface,
  $\theta' i$ is the angle of exit of the base ray (BL) from the i-th surface,
  gi is a surface configuration expression, $g=g(\xi, \eta)$, of the i-th surface, and
  $S\xi i$ and $S\eta i$ are the values of local curvatures expressed as quadratic differential of g in the $\xi$ and the $\eta$ directions at the point of incidence of the base ray (BL).

2) Procedure (b)

The k-th and the (k+1)-th surfaces are synthesized based on the following synthesis expressions:

$$M(k)+(k+1) = -Mk\{Bk+F(k+1)\} - 1 \cdot M(k+1); \text{ and}$$

$$B(k)+(k+1) = B(k+1) - M(k+1)\{Bk+F(k+1)\} - 1 \cdot M(k+1).$$

By performing calculation while successively rewriting the synthesis expressions by changing k to (k)+(k+1) and changing k+1 to k+2, the k-th to the (k+2)-th surfaces are synthesized. By repeating this calculation to the n-th surface, the composite focal length f of the k-th to the n-th surfaces is defined as follows:

($\xi$i direction)

$f\xi(k)\text{-}(n) = -M\xi(k)\text{-}(n)$; and ($\eta$i direction)

$f\eta(k)\text{-}(n) = -M\eta(k)\text{-}(n)$.

In the case of a one-plane-symmetrical optical system in which the Y-Z plane in the rectangular coordinate system (X, Y, Z) is symmetrical, the composite focal length f is defined as follows:

(X direction)

$fX(k)\text{-}(n) = f\xi(k)\text{-}(n)$; and (Y direction)

$fY(k)\text{-}(n) = f\eta(k)\text{-}(n)$.

In the following case, the following synthesis expressions are used instead of the above synthesis expressions:

When $S\xi k=0$ (when the local curvature in the $\xi$ direction is 0, that is, when the local radius of curvature is $\infty$), $M\xi(k)+(k+1) = M\xi(k+1)$, and $B\xi(k)+(k+1) = B\xi(k+1)$.

When $S\eta k=0$ (when the local curvature in the $\eta$ direction is 0, that is, when the local radius of curvature is $\infty$), $M\eta(k)+(k+1) = M\eta(k+1)\{\cos(\theta k)/\cos(\theta' k)\}$, and $B\eta(k)+(k+1) = B\eta(k+1)$.

When $S\xi(k+1)=0$ (when the local curvature in the $\xi$ direction is 0, that is, the local radius of curvature is $\infty$), $M\xi(k)+(k+1) = M\xi k$; and $B\xi(k)+(k+1) = \{B\xi k \cdot n(k+1) - d(k+1)\}/n(k+1)$.

When $S\eta(k+1)=0$ (when the local curvature in the $\eta$ direction is 0, that is, the local radius of curvature is $\infty$), $M\eta(k)+(k+1) = M\eta k\{\cos(\theta'(k+1))/\cos(\theta(k+1))\}$, and $B\eta(k)+(k+1) = [\{B\eta k \cdot n(k+1) - d(k+1)\} \cdot \cos^2(\theta'(k+1))]/\{n(k+1) \cdot \cos^2(\theta(k+1))\}$.

When $S\xi k=0$ and $S\xi(k+1)=0$ (that is, when the first surface is a parallel plate), $M\xi(k)+(k+1) = -\infty$, and $B\xi(k)+(k+1) = \infty$.

Considering synthesis of the first to the (k+2)-th surfaces, $M\xi(k)+(k+1)+(k+2) = M\xi(k+2)$, and $B\xi(k)+(k+1)+(k+2) = B\xi(k+2)$.

When $S\eta k=0$ and $S\eta(k+1)=0$ (that is, when the first surface is a parallel plate), $M\eta(k)+(k+1) = -\infty$, and $B\eta(k)+(k+1) = \infty$.

Considering synthesis of the first to the (k+2)-th surfaces, $M\eta(k)+(k+1)+(k+2) = M\zeta(k+2)$, and $B\eta(k)+(k+1)+(k+2) = B\eta(k+2)$.

The above-described definition of the focal length is the one in a plane-symmetrical optical system (that is, an optical system having one symmetrical plane; in the embodiments, the Y-Z plane is the symmetrical plane), and is based on the following papers of Forbes and Stone's:

Bryan D. Stone and G. W. Forbes, "Characterization of first-order optical properties for asymmetric systems", J. Opt. Soc. Am, A9, pp478–489 (1992); and Bryan D. Stone and G. W Forbes, "Foundations of first-order layout for asymmetric systems: an application of Hamilton's methods", J. Opt. Soc. Am, A9, pp96–109 (1992).

Even when the optical system has no plane symmetry, the focal length is easily obtained from the above-described definition expressions. Therefore, the present invention is applicable to optical systems having no plane symmetry without departing from the scope of the present invention.

In the first embodiment, from the enlargement side, the first to the third lens elements (G1) to (G3) and the diaphragm (SP) constitute a first lens unit having a negative focal length, the fourth and the fifth lens elements (G4) and (G5) constitute a second lens unit having a positive focal length, and the sixth to the ninth lens elements (G6) to (G9) constitute a third lens unit having a positive focal length. The magnifications of the lens units are easily calculated from the above-described definition expressions. The second lens unit, which bears most of the burden of zooming, has strong optical power for zooming. The third lens unit, which performs a function close to that of a relay lens, has comparatively weak optical power. In the second embodiment, from the enlargement side, the first to the third lens elements (G1) to (G3) and the diaphragm (SP) constitute a first lens unit having a negative focal length, and the fourth to the sixth lens elements (G4) to (G6) constitute a second lens unit having a positive focal length. The second lens unit bears the burden of zooming. The optical powers of the first and the second lens units are close to each other.

It is desirable that, like the embodiments, an oblique projection optical system have the first and the second lens units from the enlargement side, the first lens unit be the lens unit having a negative focal length and the second lens unit be the lens unit having a positive lens unit. By disposing the lens unit having a negative focal length on the enlargement side, the diameter of the front lens element can be reduced and the lens back focal length can be increased. By disposing the lens unit having a positive focal length next to the lens unit having a negative focal length, correction of spherical aberration and correction of the image plane are facilitated, and a telecentric structure is easily ensured.

It is desirable that at least one of the lens units having a negative focal length satisfy the condition (7) shown below.

When the lens unit having a negative focal length is disposed as the first lens unit, it is further desirable that the lens unit satisfy the condition (7') shown below.

$$0.2 \leq |f\text{-}W/fWall| \leq 10.0 \quad (7)$$

$$0.3 \leq |f\text{-}W/fWall| \leq 5.0 \quad (7')$$

where f–W is the overall focal length of the lens unit having a negative focal length in a condition where the magnification on the reduction side is lowest [W], and fWall is the overall focal length of the optical system in a condition where the magnification on the reduction side is lowest [W].

The condition (7) defines the focal length of the lens unit having a negative focal length. When the lower limit of the condition (7) is exceeded so that the focal length (absolute value) of the lens unit having a negative focal length decreases, aberration correction is difficult. When the upper limit of the condition (7) is exceeded so that the focal length (absolute value) of the lens unit having a negative focal length increases, contribution to zooming is reduced to increase the size of the projection optical system and aberrations of the other lens units cannot be completely canceled to deteriorate the overall performance of the optical system.

It is desirable that at least one of the lens units having a positive focal length satisfy the condition (8) shown below and include the diaphragm (SP) or be situated on the reduction side of the diaphragm (SP).

$$0.1 \leq f\text{+}W/fWall \leq 15.0 \quad (8)$$

where f+W is the overall focal length of the lens unit having a positive focal length in a condition where the magnification on the reduction side is lowest [W], and fWall is the overall focal length of the optical system in a condition where the magnification on the reduction side is lowest [W].

The condition (8) defines the focal length of the one, including the diaphragm (SP) or situated on the reduction side of the diaphragm (SP), of the lens units having a positive focal length. When the lower limit of the condition (8) is exceeded so that the focal length of the lens unit having a positive focal length decreases, aberration correction (particularly, correction of the image plane) is difficult, so that distortion is excessive toward the negative side. When the upper limit of the condition (8) is exceeded so that the focal length of the lens unit having a positive focal length increases, contribution to zooming is reduced to increase the size of the projection optical system and aberrations of the other lens units cannot be completely canceled to deteriorate the overall performance of the optical system.

The constructions of the oblique projection optical systems embodying the present invention will be more concretely described with reference to construction data, spot diagrams and the like. First and second examples shown here correspond to the first and the second embodiments, respectively. FIGS. 1, 2, 9 and 10 showing the embodiments illustrate the lens constructions and optical paths of the corresponding examples.

In the construction data of the examples, Si (i=0,1,2,3, . . . ) represents the i-th surface counted from the side of the secondary image plane (I2) (excluding S1) in a system including the secondary image plane (I2) (corresponding to the screen plane in the case of enlargement projection), a decentering reference surface (S1) (having no optical effect) and the primary image plane (I1) (corresponding to the display device screen in the case of enlargement projection), and ri (i=0,1,2,3, . . . ) represents the radius of curvature (mm) of the surface Si. di (i=0,1,2,3, . . . ) represents the i-th axial distance (mm) counted from the side of the secondary image plane (I2) (the distance between decentered surfaces is shown as decentering data). Ni (i=0, 1,2,3, . . . ) and vi (i=0,1,2,3, . . . ) represent the refractive index (Nd) to the d-line and the Abbe number (vd) of the i-th lens element (Gi) counted from the side of the secondary image plane (I2), respectively. Lateral magnifications β on the side of the primary image plane (I1) (reduction side) corresponding to the wide-angle condition (lowest magnification condition on the reduction side) [W], the middle condition (intermediate magnification condition) [M] and the telephoto condition (highest magnification condition on the reduction side) [T] are also shown. Values corresponding to the conditions and associated data of the examples are shown in Tables 1 and 2.

The surfaces Si marked with asterisks are aspherical and are defined by the following expression (AS) representing the configuration of an aspherical surface in the rectangular coordinate system (X, Y, Z) with each vertex as the reference, and aspherical data are shown together with the other data:

$$Z = (c \cdot h^2)/[1 + \sqrt{\{1-(1+K) \cdot c^2 \cdot h^2\}}] + (A \cdot h^4 + B \cdot h^6 + C \cdot h^8 + D \cdot h^{10} + E \cdot h^{12} + F \cdot h^{14}) \quad (AS)$$

where

Z is the amount of displacement from the reference surface in the direction of the optical axis, h is the height ($h^2 = X^2 + Y^2$) in a direction vertical to the optical axis, c is the paraxial curvature, and K, A, B, C, D, E and F are aspherical coefficients.

For the optical surface decentered with respect to the immediately preceding optical surface on the enlargement side, decentering data is shown based on the rectangular coordinate system (X, Y, Z). However, when the optical surface is moved in zooming, decentering data in each of the magnification conditions [W], [M] and [T] is shown. In the rectangular coordinate system (X, Y, Z), the parallel decentering position of the optical surface is represented by its vertex coordinates (XDE, YDE, ZDE)=(the parallel decentering position (mm) in the direction of the X axis, the parallel decentering position (mm) in the direction of the Y axis, the parallel decentering position (mm) in the Z-axis direction), and the rotational decentering position of the optical surface is represented by a rotation angle ADE(°) about the X axis with the vertex of the optical surface as the center (in the optical path diagrams, the counterclockwise direction on the plane of the figure is positive). When the optical surface is the front surface of a zoom block, the central position of the decentering reference surface (S1) is the origin (0, 0, 0) of the rectangular coordinate system (X, Y, Z). When the optical surface is not the front surface of a zoom block, the front surface of the zoom block, including the optical surface, is the decentering reference surface and the vertex of the front surface is the origin (0, 0, 0) of the rectangular coordinate system (X, Y, Z). In FIGS. 1, 2, 9 and 10, the direction of the X axis is the direction vertical to the plane of the figure (in the optical path diagrams, the direction toward the back of the plane of the figure is positive), the direction of the Y axis is the direction of the straight line where the decentering reference surface (S1) and the plane of the figure intersect (in the optical path diagrams, the upward direction is positive), and the direction of the Z axis is the direction of the normal (NL) to the decentering reference surface (S1) (the direction toward the primary image plane (I1) is positive).

The optical performances of the first and the second examples in the magnification conditions [W], [M] and [T] are shown in spot diagrams (FIGS. 3 to 5 and 11 to 13) and distortion diagrams (FIGS. 6 to 8 and 14 to 16). The spot diagrams show imaging characteristics on the primary image plane (I1). The distortion diagrams show ray positions on the primary image plane (I1) corresponding to square meshes on the secondary image plane (I2). With respect to an oblique projection optical system as a reduction system where the secondary image plane (I2) is the object plane and the primary image plane (I2) is the image plane, the object heights (mm) and the angles of view (°) corresponding to field positions (F1) to (F6) of the first and the second examples are shown in Tables 3 to 5.

When an x axis is set in the same direction as the X axis and a y axis is set in a direction vertical to the x axis and parallel to the secondary image plane (I2), the object height is represented by coordinates (x, y) with the center of the secondary image plane (I2) as the origin. When an x' axis is set in the same direction as the X axis and a y' axis is set in a direction vertical to the x' axis and parallel to the primary image plane (I1), the image height is represented by coordinates (x', y') with the center of the primary image plane (I1) as the origin. Therefore, the distortion diagrams show distortion conditions of actual images on the primary image plane (I1) viewed from a direction vertical to the x'-y' plane. When the examples are applied to an image projector, the secondary image plane (I2) which is the screen plane is the projected image plane and the primary image plane (I1) which is the device display screen is the object plane. However, in the examples, the oblique projection optical systems are reduction systems in optical design, and the optical performances are evaluated on the primary image plane (I1) with the secondary image plane (I2) being regarded as the object plane as mentioned above.

TABLE 1

Embodiment 1
β = −0.035[w]~−0.045[M]~−0.055[T]

| [Surface] | [Curvature of the Field] | [Axial Distance] | [Refractive Index] | [Abbe Number] |
|---|---|---|---|---|
| S0(I2) | r0 = ∞ | | | |
| | | d0 = 1160.000 | | |
| S1 | r1 = ∞ | | | |
| | | d1 = — | | |
| S2* | r2 = 70.685 | | | |
| | | d2 = — | N1 = 1.5295 | ν1 = 51.374 |
| S3* | r3 = 142.037 | | | |
| | | d3 = — | | |
| S4* | r4 = 776.267 | | | |
| | | d4 = 1.200 | N2 = 1.4870 | ν2 = 70.400 |
| S5 | r5 = 66.230 | | | |
| | | d5 = — | | |
| S6 | r6 = 97.143 | | | |
| | | d6 = 1.200 | N3 = 1.6534 | ν3 = 56.844 |
| S7* | r7 = 41.419 | | | |
| | | d7 = — | | |
| S8(SP) | r8 = ∞(Effective Radius = 14.360) | | | |
| | | d8 = — | | |
| S9 | r9 = 3743.825 | | | |
| | | d9 = 1.200 | N4 = 1.6143 | ν4 = 60.597 |
| S10 | r10 = 257.549 | | | |
| | | d10 = — | | |
| S11 | r11 = 53.149 | | | |
| | | d11 = 9.352 | N5 = 1.7500 | ν5 = 50.000 |

TABLE 1-continued

Embodiment 1
β = −0.035[w]~−0.045[M]~−0.055[T]

| [Surface] | [Curvature of the Field] | [Axial Distance] | [Refractive Index] | [Abbe Number] |
|---|---|---|---|---|
| S12* | r12 = −192.076 | | | |
| | | d12 = — | | |
| S13 | r13 = −98.906 | | | |
| | | d13 = 10.000 | N6 = 1.4870 | ν6 = 70.400 |
| S14 | r14 = −57.076 | | | |
| | | d14 = — | | |
| S15 | r15 = −61.948 | | | |
| | | d15 = 1.200 | N7 = 1.7990 | ν7 = 25.152 |
| S16 | r16 = 55.012 | | | |
| | | d16 = — | | |
| S17 | r17 = 48.569 | | | |
| | | d17 = 10.046 | N8 = 1.4870 | ν8 = 70.400 |
| S18* | r18 = −59.128 | | | |
| | | d18 = — | | |
| S19 | r19 = 126.403 | | | |
| | | d19 = 3.126 | N9 = 1.8470 | ν9 = 23.800 |
| S20* | r20 = 7318.386 | | | |
| | | d20 = — | | |
| S21(I1) | r21 = ∞ | | | |

[Aspherical Data of 2nd Surface (S2)]

K=0.000000

A=0.100663×10$^{-6}$

B=−0.201731×10$^{-9}$

C=0.168524×10$^{-12}$

D=−0.770693×10$^{-16}$

E=0.179700×10$^{-19}$

F=−0.173378×10$^{-23}$

[Aspherical Data of 3rd Surface (S3)]

K=0.000000

A=0.518437×10$^{-6}$

B=−0.944027×10$^{-10}$

C=0.837640×10$^{-14}$

D=0.126090×10$^{-18}$

E=−0.636715×10$^{-22}$

F=0.304537×10$^{-26}$

[Aspherical Data of 4th Surface (S4)]

K=0.000000

A=0.911680×10$^{-6}$

B=−0.110914×10$^{-9}$

C=0.154301×10$^{-13}$

D=−0.193095×10$^{-18}$

[Aspherical Data of 7th Surface (S7)]

K=0.000000

A=0.954928×10$^{-6}$

B=0 940905×10$^{-9}$

C=−0.781699×10$^{-12}$

D=0.110390×10$^{-14}$

[Aspherical Data of 12th Surface (S12)]

K=0.000000

A=0.491449×10$^{-6}$

B=0.775851×10$^{-9}$

C=−0.113238×10$^{-11}$

D=0.714375×10$^{-15}$

[Aspherical Data of 18th Surface (S18)]
K=0.000000
A=0.392021×10⁻⁵
B=-0 282893×10⁻⁸
C=0.555979×10⁻¹¹
D=-494096×10⁻¹⁴

[Aspherical Data of 20th Surface (S20)]
K=0.000000
A=-0.591797×10⁻⁶
B=0.561567×10⁻⁸
C=-0.424013×10⁻¹¹
D=0.422498×10⁻¹⁴

[Decentering Date of Secondary Image Surface (S0)]
ADE=-30.000

[Decentering Date of 2nd Surface (S2) (Reference Surface: S1)]
XDE=0.000
YDE=16.256[W]~-6.704[M]~-3.390[T]
ZDE=-73.551[W]~-59.403[M]~-45.495[T]
ADE=5.755[W]~11.682[M]~20.073[T]

[Decentering Data of an Surface (S3) (Reference: S2)]
XDE=0.000
YDE=-75.248
ZDE=37.265
ADE=39.171

[Decentering Data of 4th Surface (S4) (Reference: S1)]
XDE=0.000
YDE=48.750[W]~58.751[M]~71.019[T]
ZDE=-57.845[W]~-41.850[M]~-23.192[T]
ADE=-7.139[W]~-12. 300[M]~-21.713[T]

[Decentering Data of 6th Surface (S6) (Referene: S1)]
XDE=0.000
YDE=26.754[W]~35.022[M]~45.824[T]
ZDE=-26.840[W]~-12.790[M]~-0.400[T]
ADE=-22.119[W]~-27.284[M]~-36.698[T]

[Decentering Data of Stop (S8) (Referenc: S1)]
XDE=0.000
YDE=0.000[W]~-2.194[M]~-11.328[T]
ZDE=50.000[W]~52.220[M]~41.072[T]
ADE=0.000

[Decentering Date of 9th Surface (S9) (Reference: S1)]
XDE=0.000
YDE=-14.919[W]~-35.932[M]~-52.470[T]
ZDE=50.147[W]~46.565[M]~26.765[T]
ADE=-19.633[W]~-14.487[M]~-16.381[T]

[Decentering Data of 11th Surface (S11) (Referenc: S1)]
XDE=0.000
YDE=-8.270[W]~-1.943[M]~5.097[T]
ZDE=70.524[W]~60.565[M]~54.463[T]
ADE=-7.876[W]~13.057[M]~20.549[T]

[Decentering Data of 18th Surface (S13) (Reference: S1)]
XDE=0.000
YDE=-25.235[W]~-21.087[M]~-17.628[T]
ZDE=92.944[W]~84.645[M]~79.324[T]
ADE=-20.669[W]~-25.586[M]~-30.864[T]

[Decentering Data of 15th Surface (S16) (Reference: S13)]
XDE=0.000
YDE=12.681
ZDE=9.726
ADE=13.052

[Decentering Data of 17th Surface (S17) (Referenee: S13)]
XDE=0.000
YDE=16.227
ZDE=11.373
ADE=9.228

[Decentering Data of 19th Surface (S19) (Reference: S13)]
XDE=0.000
YDE=18.552
ZDE=25.192
ADE=8.996

[Decentering Date of Primary Image Plane (S21) (Reference: S1)]
XDE=0.000
YDE=-87.132
ZDE=176.461
ADE=-9.805

Embodiment 2
$\beta = -0.035[w]\sim-0.045[M]\sim-0.055[T]$

| [Surface] | [Curvature of the Field] | [Axial Distance] | [Refractive Index] | [Abbe Number] |
|---|---|---|---|---|
| S0(I2) | r0 = ∞ | | | |
| | | d0 = 1160.000 | | |
| S1 | r1 = ∞ | | | |
| | | d1 = — | | |
| S2* | r2 = 140.313 | | | |
| | | d2 = — | N1 = 1.6518 | v1 = 56.994 |
| S3* | r3 = 40.940 | | | |
| | | d3 = — | | |
| S4* | r4 = 61.067 | | | |
| | | d4 = 8.125 | N2 = 1.7678 | v2 = 29.478 |
| S5 | r5 = -381.229 | | | |
| | | d5 = — | | |
| S6(SP) | r6 = ∞ (Effective Radius = 8.445) | | | |
| | | d6 = — | | |
| S7* | r7 = -34.362 | | | |
| | | d7 = 3.500 | N3 = 1.8470 | v3 = 23.800 |
| S8 | r8 = 89.489 | | | |
| | | d8 = 2.000 | | |
| S9 | r9 = -152.436 | | | |
| | | d9 = 11.034 | N4 = 1.7500 | v4 = 50.000 |
| S10 | r10 = -37.831 | | | |
| | | d10 = — | | |
| S11 | r11 = 217.781 | | | |
| | | d11 = 8.222 | N5 = 1.4941 | v5 = 69.614 |
| S12 | r12 = -36.229 | | | |
| | | d12 = — | | |
| S13* | r13 = 53.393 | | | |
| | | d13 = 10.587 | N6 = 1.7393 | v6 = 50.597 |
| S14* | r14 = 53.892 | | | |
| | | d14 = — | | |
| S15(I1) | r15 = ∞ | | | |

[Aspherical Data of 2nd Surface (S2)]
K=0.000000
A=0.193625×10⁻⁵
B=-0.552691×10⁻⁹
C=0.141791×10⁻¹²
D=-0.166669×10⁻¹⁶

[Aspherical Data of 3rd Surface (S3)]
K=0.000000
A=0.310866×10⁻⁵
B=0.806827×10⁻¹⁰

C=−0.183841×10$^{-12}$
D=0.547511×10$^{-15}$

[Aspherical Data of 4rd Surface (S4)]
K=0.000000
A=−0.502056×10$^{-7}$
B=−0.146504×10$^{-8}$
C=0.294027×10$^{-11}$
D=−0.215353×10$^{-14}$

[Aspherical Data of 7th Surface (S7)]
ADE=0.000000
A=−0.139557×10$^{-5}$
B=−0.794955×10$^{-8}$
C=0.113289×10$^{-9}$
D=−0.296343×10$^{-12}$

[Aspherical Data of 13th Surface (S13)]
K=0.000000
A=0.205870×10$^{-5}$
B=−0.967201×10$^{-9}$
C=0.153773×10$^{-12}$
D=0.494210×10$^{-16}$

[Aspherical Data of 14th Surface (S14)]
K=0.000000
A=0.254874×10$^{-5}$
B=−0.307173×10$^{-8}$
C=0.153587×10$^{-11}$
D=−0.323440×10$^{-15}$

[Decentering Data of Secondary image plane (S2) (Reference: S1)]
ADE=−30.000

[Decentering Data of 2nd Surface (S2) (Reference: S1)]
XDE=0.000
YDE=40.006[W]~30.898[M]~21.906[T]
ZDE=−90.439[W]~−86.533[M]~−84.346[T]
ADE=−8.209[W]~−3.141[M]~3.854[T]

[Decentering Data of 3rd Surface (S3) (Reference: S2)]
XDE=0.000
YDE=−0.480
ZDE=15.734
ADE=−5.439

[Decentering Data of 4th Surface (S4) (Reference: S1)]
XDE=0.000
YDE=−0.738[W]~2.437[M]~0.820[T]
ZDE=−17.170[W]~−33.174[M]~−48.117[T]
ADE=0.250[W]~−6.421[M]~−10.088[T]

[Decentering Data of Stop (S6) (Reference: S1)]
XDE=0.000
YDE=0.000[W]~2.032[M]~2.043[T]
ZDE=5.397[W]~−7.515[M]~−17.570[T]
ADE=0.000

[Decentering Data of 7th Surface (S7) (Reference: S1)]
XDE=0.000
YDE=−4.083[W]~−2.008[M]~−2.510[T]
ZDE=7.389[W]~−4.604[M]~−15.796[T]
ADE=−3.626[W]~−10.484[M]~−13.653[T]

[Decentering Data of 9th Surface (S9) (Reference: S1)]
XDE=0.000
YDE=−12.852[W]~−9.548[M]~−8.123[T]
ZDE=10.630[W]~−1.387[M]~−1.661[T]
ADE=−15.809[W]~−20.815[M]~−22.311[T]

[Decentering Data of 11th Surface (S11) (Reference: S1)]
XDE=0.000
YDE=−1.403[W]~−1.312[M]~−1.759[T]
ZDE=24.059[W]~13.368[M]~3.407[T]
ADE=−10.276[W]~−15.160[M]~−17.759[T]

[Decentering Data of 13th Surface (S13) (Reference: S1)]
XDE=0.000
YDE=25.979[W]~30.528[M]~26.108[T]
ZDE=49.293[W]~45.602[M]~41.637[T]
ADE=−48.456[W]~−52.618[M]~−54.732[T]

[Decentering Data of Primart image plane (S15) (Reference: S1)]
XDE=0.000
YDE=−36.134
ZDE=79.576
ADE=−42.677.

TABLE 1

| | Condition | Embodiment 1 | Embodiment 2 |
|---|---|---|---|
| (1) | $|\theta_{oi}|$ (°) | 20.15 | 12.68 |
| (2) | $v_o$ (°) | 31.08 | 30.74 |
| (3) | $\beta_W/\beta_T$ | 0.6363 | 0.6363 |
| | LPW/LPT | 0.8815 | 0.8208 |
| | (LPW/LPT)/($\beta_W/\beta_T$) | 1.385 (G5) | 1.290 (G2) |
| (4) | Pf/Pn | 3.59 (G2) | 1.395 (G1) |
| (5) | Nb | 1.799 | 1.847 |
| (6) | vb | 25.152 | 23.008 |

TABLE 2

| Condition | Embodiment 1 | Embodiment 2 |
|---|---|---|
| Negative Unit | G1–G3 | G1–G3 |
| (7), (7') | ζ-direction 2.14 | ζ-direction 0.66 |
| $|f - w/fwall|$ | η-direction 2.22 | η-direction 0.75 |
| Positive Unit | G4, G5 | G4–G6 |
| (8) | ζ-direction 1.51 | ζ-direction 0.72 |
| f + w/fwall | η-direction 1.31 | η-direction 0.76 |
| | | G6–G9 |
| | | ζ-direction 7.28 |
| | | η-direction 6.29 |

TABLE 3

Object height in accordance with each field position [mm] in Embodiments 1 and 2

| Field Position | [W] x | [W] y | [M] x | [M] y | [T] X | [T] y |
|---|---|---|---|---|---|---|
| F1 | 0.000 | 0.000 | 0.000 | 0.000 | 0.000 | 0.000 |
| F2 | 0.000 | 400.000 | 0.000 | 310.000 | 0.000 | 254.000 |
| F3 | 0.000 | −400.000 | 0.000 | −310.000 | 0.000 | −254.000 |
| F4 | 400.000 | 400.000 | 310.000 | 310.000 | 254.000 | 254.000 |
| F5 | 400.000 | −400.000 | 310.000 | −310.000 | 254.000 | −254.000 |
| F6 | 400.000 | 0.000 | 310.000 | 0.000 | 254.000 | 0.000 |

TABLE 4

Field angle in accordance with each field position [ ] in Embodiment 1

| Field Position | [W] x | [W] y | [M] x | [M] y | [T] X | [T] Y |
|---|---|---|---|---|---|---|
| F1 | 0.000 | 1.088 | 0.000 | 1.528 | 0.000 | 1.939 |
| F2 | 0.000 | −18.4 | 0.000 | −12.8 | 0.000 | −9.49 |
| F3 | 0.000 | 14.73 | 0.000 | 12.38 | 0.000 | 11.05 |
| F4 | −22.5 | −18.4 | −16.8 | −12.9 | −13.5 | −9.50 |
| F5 | −16.1 | 14.66 | −13.0 | 12.34 | −10.9 | 11.05 |
| F6 | −18.8 | 1.011 | −14.7 | 1.487 | −12.0 | 1.931 |

TABLE 5

Field angle in accordance with each field position [mm] in Embodiments 2

| Field Position | [W] x | [W] y | [M] x | [M] y | [T] x | [T] Y |
|---|---|---|---|---|---|---|
| F1 | 0.000 | 0.737 | 0.000 | 0.566 | 0.000 | 0.431 |
| F2 | 0.000 | −19.7 | 0.000 | −14.8 | 0.000 | −12.00 |
| F3 | 0.000 | 15.00 | 0.000 | 12.19 | 0.000 | 10.29 |
| F4 | −23.4 | −20.3 | −17.7 | −14.8 | −14.3 | −12.0 |
| F5 | −16.6 | 14.94 | −13.5 | 12.16 | −11.4 | 10.28 |
| F6 | −19.5 | 0.673 | −15.4 | 0.539 | −21.7 | 0.481 |

As described above, according to the oblique projection optical systems of the examples, compact and high-performance oblique projection optical systems can be realized which are practical wide-angle and high-magnification zoom optical systems and in which a sufficient angle of oblique projection can be secured.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. An oblique projection optical system performing enlargement projection in a slanting direction from a primary image plane to a secondary image plane, or reduction projection in a slanting direction from the secondary image plane to the primary image plane, said oblique projection optical system comprising:

at least two lens units each comprising at least one lens element and having surfaces decentered with respect to each other, wherein zooming is performed by moving, of said lens units, a plurality of lens units, and wherein when a ray connecting a center of the primary image plane and a center of the secondary image plane is referred to as an image plane center ray, the following conditions are satisfied without an intermediate real image being formed between the primary image plane and the secondary image plane:

$5° < |θoi| < 40°$ $20° < θo < 50°$ where $|θoi|$ is an angle between the primary image plane and the secondary image plane; and $θo$ is an angle between a normal to the secondary image plane and the image plane center ray in a condition where a magnification on a primary image plane side is lowest.

2. An oblique projection optical system as claimed in claim 1, wherein in zooming from a condition where the magnification on the primary image plane side is low to a condition where the magnification is high, at least one positive lens unit is monotonously moved toward the secondary image plane.

3. An oblique projection optical system as claimed in claim 1, wherein in zooming from a condition where the magnification on the primary image plane side is low to a condition where the magnification is high, at least one positive lens unit is moved, and the positive lens unit satisfies the following condition:

$0.7 < (LPW/LPT)/(βW/βT) < 2.5$ where $βT$ is a highest magnification on the primary image plane side, $βW$ is a lowest magnification on the primary image plane side, LPT is an optical path length of the image plane center ray from a most secondary image plane side surface to a most primary image plane side surface of the positive lens unit in a condition where the magnification on the primary image plane side is highest, and LPW is an optical path length of the image plane center ray from the most secondary image plane side surface to the most primary image plane side surface of the positive lens unit in the condition where the magnification on the primary image plane side is lowest.

4. An oblique projection optical system as claimed in claim 1, further so comprising a diaphragm, wherein at least one lens element whose both side surfaces are convex to a secondary image plane side is provided on the secondary image plane side of the diaphragm, and the lens element satisfies the following condition on a cross section where the image plane center ray is situated obliquely to the secondary image plane when the magnification on the primary image plane side is lowest:

$1.1 < Pf/Pn < 4.5$ where

Pn is an optical path length of a principal ray passing through the lens element, said principal ray forming a smallest angle with respect to the normal to the secondary image plane, and Pf is an optical path length of a principal ray passing through the lens element, said principal ray forming a largest angle with respect to the normal to the secondary image plane.

5. An oblique projection optical system as claimed in claim 1, further comprising a diaphragm, wherein a negative lens element and a positive lens element are provided in this order from a reduction side of the diaphragm, and the negative lens element satisfies the following conditions:

$Nb > 1.7$ $vb < 40$ where

Nb is a refractive index, to a d-line, of a medium of the negative lens element, and νb is an Abbe number of the medium of the negative lens element.

6. An oblique projection optical system including at least one decentered lens element, said oblique projection optical system comprising:
   a lens unit having a negative focal length and comprising at least one lens element; and
   a lens unit having a positive focal length and comprising at least one lens element,
   wherein an overall focal length of the oblique projection optical system is varied by varying at least one of relative positions of the lens unit having the negative focal length and the lens unit having the positive focal length,
   where the focal length of the oblique projection optical system is defined as follows:
   by using as a reference a ray (base ray) traveling from an object center by way of a diaphragm center toward an image plane, a value ascribed to a given surface (an i-th surface) is defined by a procedure (a), and a composite focal length from a given surface (a k-th surface) to a given surface (an n-th surface) is defined by a procedure (b); here, a coordinate system of the i-th surface is a rectangular coordinate system ($\xi i, \eta, \zeta i$) defined as follows: a direction of a normal to the i-th surface is a $\zeta i$ axis, a direction vertical to a surface formed by the base ray incident on the i-th surface and the normal to the i-th surface (that is, a plane of incidence) is a $\xi i$ axis, and a direction where Qi×Ei is positive is a positive direction; Qi is a vector in a direction in which the base ray is incident on the i-th surface, Ei is a vector in the direction of the normal to the i-th surface, and the $\eta i$ axis is decided by a right hand system with respect to the $\xi i$ axis and the $\zeta i$ axis;

1) procedure (a)

($\xi i$ direction)

$F\xi i = -(di/ni) - \{1/(Di \cdot S\xi i)\}$, $M\xi i = 1/(Di \cdot S\xi i)$, and $B\xi i = -1/(Di \cdot S\xi i)$;

($\eta i$ direction)

$F\eta i = -(di/ni) - \{1/(Di \cdot S\eta i)\} \cdot \cos^2(\theta i)$, $M\eta i = \{1/(Di \cdot \eta i)\} \cdot \cos(\theta i) \cdot \cos(\theta' i)$, and $B\eta i = -\{1/(Di \cdot S\eta i)\} \cdot \cos^2(\theta' i)$;

here $Di = \{ni \cdot \cos(\theta i) - n'i \cdot \cos(\theta' i)\}$, $S\xi i = \partial^2 gi/\partial \xi^2$, and $S\eta i = \partial^2 gi/\partial \eta^2$, where di is an actual distance, along the base ray, from a point of exit of an (i−1)-th surface to a point of incidence on the i-th surface,
   ni is a refractive index of a medium of the i-th surface on a side immediately before incidence of the base ray,
   ni' is a refractive index of the medium of the i-th surface on a side immediately after the incidence of the base ray,
   $\theta i$ is an angle of incidence of the base ray on the i-th surface,
   $\theta' i$ is an angle of exit of the base ray from the i-th surface,
   gi is a surface configuration expression, $g = g(\xi, \eta)$, of the i-th surface, and
   $S\xi i$ and $S\eta i$ are values of local curvatures expressed as quadratic differential of g in the $\xi$ and $\eta$ directions at the point of incidence of the base ray;

2) procedure (b)
   the k-th surface and a (k+1)-th surface are synthesized based on the following synthesis expressions:

$M(k)+(k+1) = -Mk\{Bk+F(k+1)\}-1 \cdot M(k+1)$, and $B(k)+(k+1) = B(k+1) - M(k+1)\{Bk+F(k+1))\}-1 \cdot M(k+1)$;

by performing calculation while successively rewriting the synthesis expressions by changing k to (k)+(k+1) and changing k+1 to k+2, the k-th to a (k+2)-th surfaces are synthesized and by repeating this calculation to the n-th surface, the composite focal length f of the k-th to the n-th surfaces is defined as follows:

($\xi i$ direction)

$f\xi(k)-(n) = -M\xi(k)-(n)$, and ($\eta i$ direction)

$f\eta(k)-(n) = -M\eta(k)-(n)$;

in a case of a one-plane-symmetrical optical system in which a Y-Z plane in a rectangular coordinate system (X, Y, Z) is symmetrical, the composite focal length f is defined as follows:

(X direction)

$fX(k)-(n) = f\xi(k)-(n)$, and (Y direction)

$fY(k)-(n) = f\eta(k)-(n)$;

in the following case, the following synthesis expressions are used instead of the above synthesis expressions:

when $S\xi k = 0$ (when a local curvature in the $\xi$ direction is 0, that is, when a local radius of curvature is $\infty$), $M\xi(k)+(k+1) = M\xi(k+1)$, and $B\xi(k)+(k+1) = B\xi k+1$);

when $S\eta k = 0$ (when a local curvature in the $\eta$ direction is 0, that is, when a local radius of curvature is $\infty$), $M\eta(k)+(k+1) = M\eta(k+1)\{\cos(\theta k)/\cos(\theta' k)\}$, and $B\eta(k)+(k+1) = B\eta(k+1)$;

when $S\xi(k+1) = 0$ (when the local curvature in the $\xi$ direction is 0, that is, the local radius of curvature is $\infty$), $M\xi(k)+(k+1) = M\xi k$, and $B\xi(k)+(k+1) = \{B\xi k \cdot n(k+1) - d(k+1)\}/n(k+1)$;

when $S\eta(k+1) = 0$ (when the local curvature in the $\eta$ direction is 0, that is, the local radius of curvature is $\infty$), $$M\eta(k)+(k+1)=M\eta k\{\cos(\theta'(k+1))/\cos(\theta(k+1))\}, \text{ and}$$

$$B\eta(k)+(k+1)=[\{B\eta k \cdot n(k+1)-d(k+1)\}\cdot\cos^2(\theta'(k+1))]/\{n(k+1)\cdot\cos^2(\theta(k+1))\};$$

when $S\xi k=0$ and $S\xi(k+1)=0$ (that is, when a first surface is a parallel plate), $$M\xi(k)+(k+1)=-\infty, \text{ and}$$

$$B\xi(k)+(k+1)=\infty;$$

considering synthesis of the first to the (k+2)-th surfaces, $$M\xi(k)+(k+1)+(k+2)=M\xi(k+2), \text{ and}$$

$$B\xi(k)+(k+1)+(k+2)=B\xi(k+2);$$

when $S\eta k=0$ and $S\eta(k+1)=0$ (that is, when the first surface is a parallel plate), $$M\eta(k)+(k+1)=-\infty, \text{ and}$$

$$B\eta(k)+(k+1)=\infty;$$

considering synthesis of the first to the (k+2)-th surfaces, $$M\eta(k)+(k+1)+(k+2)=M\eta(k+2), \text{ and}$$

$$B\eta(k)+(k+1)+(k+2)=B\eta(k+2).$$

7. An oblique projection optical system as claimed in claim 6, wherein at least one of the lens units having the negative focal length satisfies the following condition:

$$0.2 \leq |f-W/fWall| \leq 10.0$$

where f−W is an overall focal length of the lens unit having the negative focal length in a condition where a magnification on a reduction side is lowest, and fwall is the overall focal length of the oblique projection optical system in the condition where the magnification on the reduction side is lowest.

8. An oblique projection optical system as claimed in claim 6, wherein at least one of the lens units having the positive focal length satisfies the following condition, and includes a diaphragm or is situated on a reduction side of the diaphragm:

$$0.1 \leq f+W/fWall \leq 15.0$$

where f+W is an overall focal length of the lens unit having the positive focal length in a condition where a magnification on the reduction side is lowest, and fWall is the overall focal length of the oblique projection optical system in the condition where the magnification on the reduction side is lowest.

9. An oblique projection optical system as claimed in claim 6, wherein a first lens unit and a second lens unit are provided from an enlargement side, and wherein the first lens unit is the lens unit having the negative focal length, and the second lens unit is the lens unit having the positive focal length.

\* \* \* \* \*

UNITED STATES PATENT AND TRADEMARK OFFICE
CERTIFICATE OF CORRECTION

PATENT NO.    : 6,450,648 B1
DATED         : September 17, 2002
INVENTOR(S)   : Soh Ohzawa et al.

It is certified that error appears in the above-identified patent and that said Letters Patent is hereby corrected as shown below:

Column 10,
Line 10, delete "M$\eta$(k)+(k+1)+(k+2)=M$\xi$(k+2)", and insert
-- M$\eta$(k)+(k+1)+(k+2)=M$\eta$ (k+2) --.

Column 13,
Line 44, (TABLE 1), after "Embodiment 1", delete
""$\beta$= –0.035 [w]~ –0.045 [M]~ –0.055 [T]", and insert
-- $\beta$= –0.035 [W]~ –0.045 [M]~ –0.055 [T] --.

Column 14,
Line 4, (the continuation of TABLE 1), after "Embodiment 1", delete
"$\beta$= –0.035 [w]~ –0.045 [M]~ –0.055[T]", and insert
-- $\beta$= –0.035 [W]~ –0.045 [M]~ –0.055[T] --.
Line 41, (the fourth line under the heading) "[Aspherical Data of 3rd Surface (S3)])", delete "C=0.837640 x $10^{-14}$", and insert -- C=0.837540 x $10^{-14}$ --.
Line 57, (the third line under the heading) "[Aspherical Data of 7th Surface (S7)])"), delete "B=0940905 x $10^{-9}$", and insert -- B=0.940905 x $10^{-9}$ --.
Line 64, (the second line under the heading "[Aspherical Data of 12th Surface (S12)])", delete "A=0.491449 x $10^{-6}$", and insert -- A=0.481449 x $10^{-6}$ --.
Line 65, (the third line under the heading "[Aspherical Data of 12th Surface (S12)])", delete "B=0.775851 x $10^{-9}$", and insert -- B= 0.726851 x $10^{-9}$ --.

Column 15,
Line 4 (the third line under the heading "[Aspherical Data of 18th Surface (S18)]"), delete "B= –0283893 x $10^{-8}$", and insert -- B= –0.283893 x $10^{-8}$ --.
Line 6 (the fifth line under the heading "[Aspherical Data of 18th Surface (S18)]"), delete "D= –494096 x $10^{-14}$", and insert -- D= –0.494096 x $10^{-14}$ --.
Line 10 (the third line under the heading "[Aspherical Data of 20th Surface (S20)]"), delete "B=0.561567 x $10^{-8}$", and insert -- B=0.361567 x $10^{-8}$ --.
Line 13, delete "[Decentering Date of 2nd Surface (S2) (Reference Surface: S1)]", and insert -- [Decentering Data of Secondary Image Surface (S0)] --.
Line 15, delete "[Decentering Date of 2nd Surface (S2) (Reference Surface: S1)]", and insert -- [Decentering Data of 2nd Surface (S2) (Reference Surface: S1)] --.
Line 22, (the third line under the heading "[Decentering Date of 2nd Surface (S2) (Reference Surface: S1)]" (sic), delete "ZDE= –73.551[W] ~59.403[M] ~ –45.495[T]" and insert -- ZDE= –73.551[W] ~ –59.403[M] ~ –45.495[T] --.

UNITED STATES PATENT AND TRADEMARK OFFICE
CERTIFICATE OF CORRECTION

PATENT NO. : 6,450,648 B1
DATED : September 17, 2002
INVENTOR(S) : Soh Ohzawa et al.

It is certified that error appears in the above-identified patent and that said Letters Patent is hereby corrected as shown below:

Column 15 (continued),
Line 24, delete "[Decentering Data of an Surface (S3) Reference: S2)]", and insert -- [Decentering Data of 3rd Surface (S3) (Reference: S2)] --.
Line 34, (the fourth line under the heading "[Decentering Data of 4th Surface (S4) (Reference: S1)])", delete "ADE= –7.139[W]", and insert -- ADE= –7.134[W] --.
Line 35, delete "[Decentering Data of 6th Surface (S6)(Referene: S1)]", and insert -- [Decentering Data of 6th Surface (S6) (Reference: S1)] --.
Line 39, (the third line under the heading "[Decentering Data of 6th Surface (S6) (Referene: S1)])" (sic), delete "ZDE = –26.840[W] ~ –12.790[M] ~ –0.400[T]", and insert -- ZDE = –26.840[W] ~ –12.740[M] ~ –0.400[T]" --.
Line 41, delete "[Decentering Data of Stop (S8) (Referenc: S1)]", and insert -- [Decentering Data of Stop (S8) (Reference: S1)] --.
Line 46, delete "[Decentering Date of 9th Surface (S9) (Reference: S1)]", and insert -- [Decentering Data of 9th Surface (S9) (Reference: S1)] --.
Line 51, delete "[Decentering Data of 11th Surface (S11) (Referenc: S1)]", and insert -- [Decentering Data of 11th Surface (S11) (Reference: S1)] --.
Line 57, (the fourth line under the heading "[Decentering Data of 11th Surface (S11) (Referenc: S1)]" (sic), delete "ADE = –7.876 [W] ~ 13.057 [M] ~ –20.549[T]", and insert -- ADE = –7.876 [W] ~ –13.057 [M] ~ –20.549[T] --.
Line 58, delete "[Decentering Data of 18th Surface (S13)'(Reference: S1)]", and insert --[Decentering Data of 13th Surface (S13) (Reference: S1)]--.
Line 65, delete "[Decentering Data of 15th Surface (S16) (Reference: S13)]", and insert -- [Decentering Data of 15th Surface (S15) (Reference: S13)] --.

Column 16,
Line 3, delete "[Decentering Data of 17th Surface (S17) (Referenee: S13)]", and insert -- [Decentering Data of 17th Surface (S17) (Reference: S13)]--.
Line 12 (the second line under the heading "[Decentering Data of 19th Surface (S19) (Reference: S13)]"), delete "YDE=18.552", and insert -- YDE=18.522 --.
Lines 15 and 16, delete "[Decentering Date of Primary Image Plane (S21) (Reference: S1)]", and insert -- [Decentering Data of Primary Image Plane (S21) (Reference: S1)] --.
Line 26, (after "Embodiment 2"), delete "$\beta$= –0.035 [w]~ –0.045 [M]~ –0.055[T]", and insert -- $\beta$= –0.035 [W]~ –0.045 [M]~ –0.055[T] --.
Line 46, after "S10", delete "r10= –37.831", and insert -- r10= –37.834 --.
Line 54, delete "Asphericel", and insert -- Aspherical --.

UNITED STATES PATENT AND TRADEMARK OFFICE
CERTIFICATE OF CORRECTION

PATENT NO.    : 6,450,648 B1
DATED         : September 17, 2002
INVENTOR(S)   : Soh Ohzawa et al.

It is certified that error appears in the above-identified patent and that said Letters Patent is hereby corrected as shown below:

Column 17,
Line 3, delete "4rd", and insert -- 4th --.
Lines 11 and 12, the first line under the heading "[Aspherical Data of 7th Surface (S7)]", delete "ADE=0.000000", and insert -- K=0.000000 --.
Line 33, delete "[Decentering Data of Secondary image plane (S2)", and insert -- [Decentering Data of Secondary image plane (S0) --.

Column 18,
Line 5, delete "ZDE=10.630[W] ~ –1.387[M] ~ –1.661[T]", and insert -- ZDE=10.630[W] ~ –1.387[M] ~ –11.661[T] --.
Line 17, (the second line under the heading "[Decentering Data of 13th Surface (S13) (Reference: S1)])", delete "YDE=25.979[W] ~ 30.528[M] ~ 26.108[T]", and insert -- YDE=35.979[W] ~ 30.528[M] ~ 26.108[T] --.
Line 20, delete "Primart" and insert -- Primary --.
Line 33 (line 6 of TABLE 1), after "Condition (2)", delete "$vo$ (°)", and insert -- $\theta o$ (°) --.

Column 20,
Line 34, delete "so".

Column 21,
Line 24, delete "($\xi i$, $\eta$, $\zeta i$)", and insert -- ($\xi i$, $\eta i$, $\zeta i$) --.

Line 44, delete "$\eta !$ direction", and insert -- $\eta i$ direction --.

Line 46, delete "$M\eta i = \{1/(Di \cdot \eta i)\} \cdot \cos(\theta i) \cdot \cos(\theta' i)$", and insert -- $M\eta i = \{1/(Di \cdot S\eta i)\} \cdot \cos(\theta i) \cdot \cos(\theta' i)$ --.

Column 22,
Line 16, delete "$B(k)+(k+l)=B(k+l)-M(k+l)\{Bk+F(k+l))\}-1 \cdot M(k+1)$", and insert -- $B(k)+(k+l)=B(k+l)-M(k+l)\{Bk+F(k+l)\}-1 \cdot M(k+1)$ --.

UNITED STATES PATENT AND TRADEMARK OFFICE
CERTIFICATE OF CORRECTION

PATENT NO. : 6,450,648 B1
DATED : September 17, 2002
INVENTOR(S) : Soh Ohzawa et al.

It is certified that error appears in the above-identified patent and that said Letters Patent is hereby corrected as shown below:

<u>Column 24,</u>
Line 5, delete "fwall", and insert -- fWall --.

Signed and Sealed this

Sixth Day of April, 2004

JON W. DUDAS
*Acting Director of the United States Patent and Trademark Office*